March 21, 1967 D. ELFORD 3,310,152
FRUIT HANDLING APPARATUS
Filed Jan. 21, 1965 17 Sheets-Sheet 15
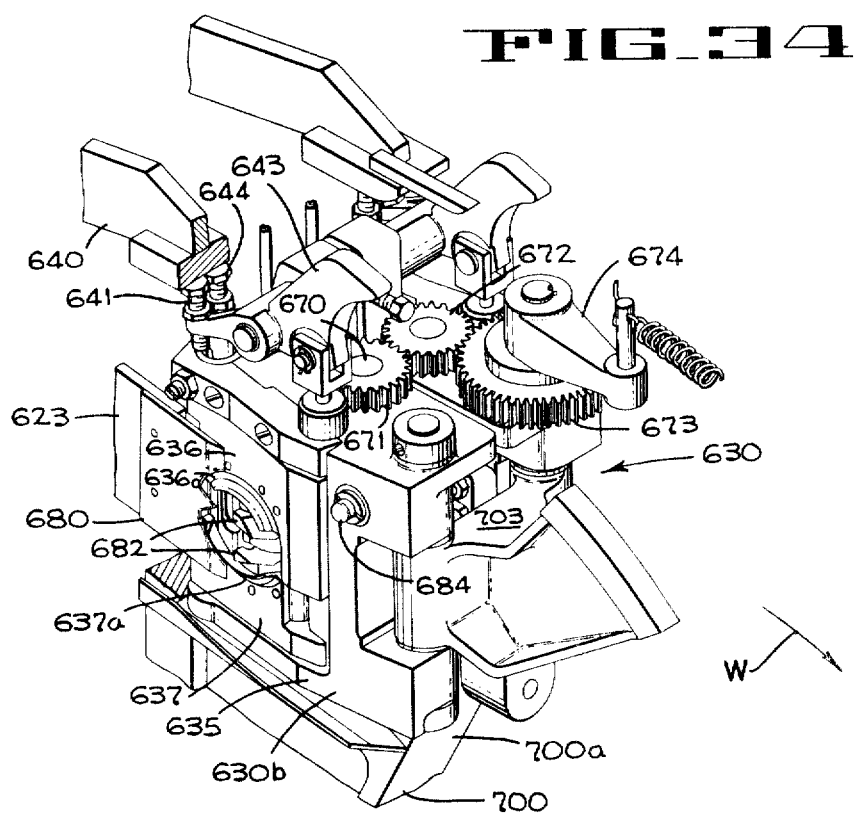
FIG_34
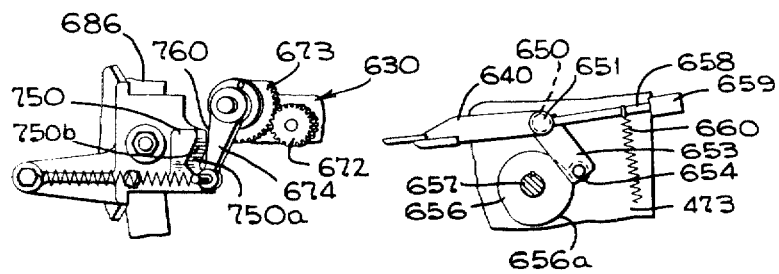
FIG_36  FIG_35
INVENTOR
DAVID ELFORD
BY Hans G. Hoffmeister
ATTORNEY

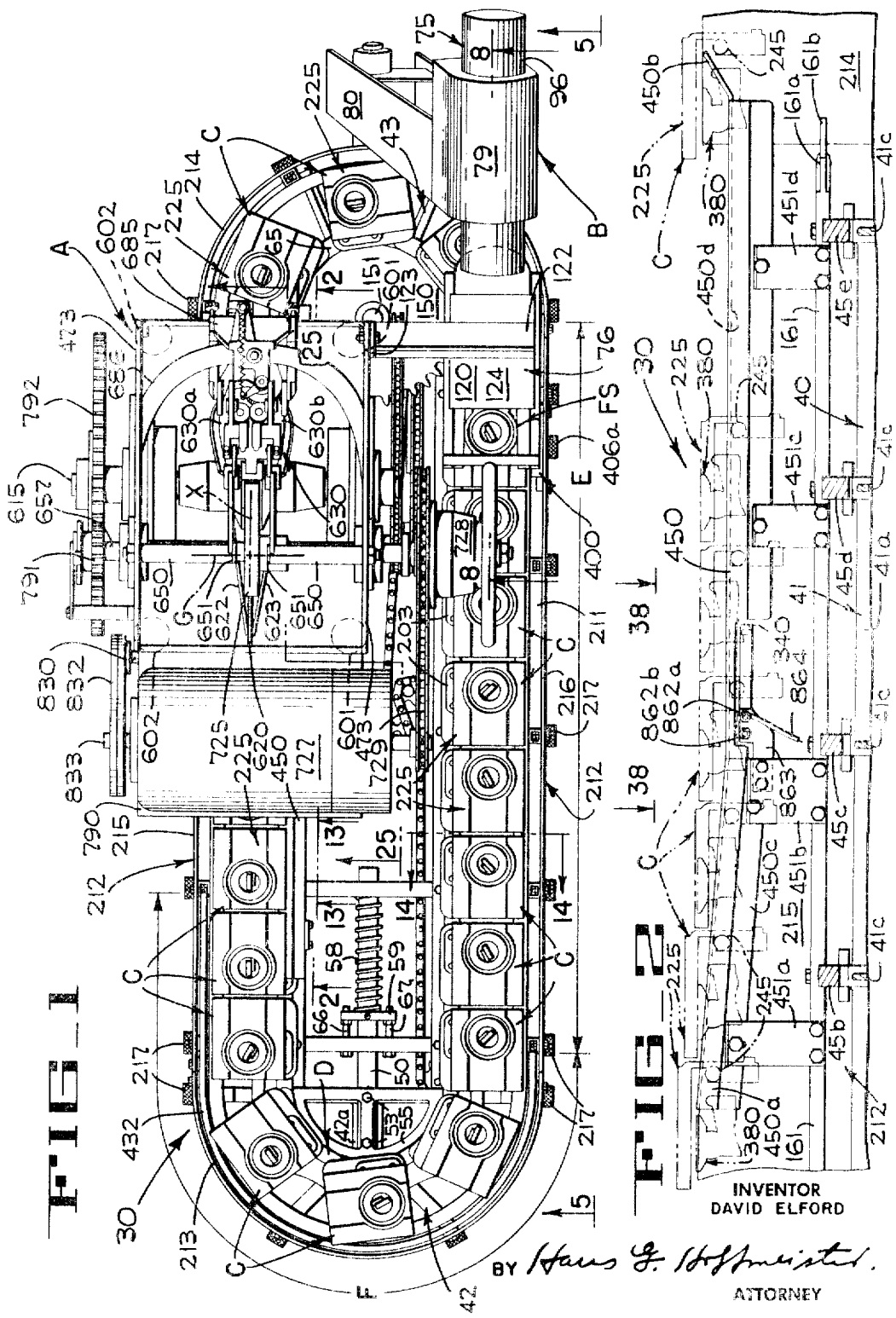

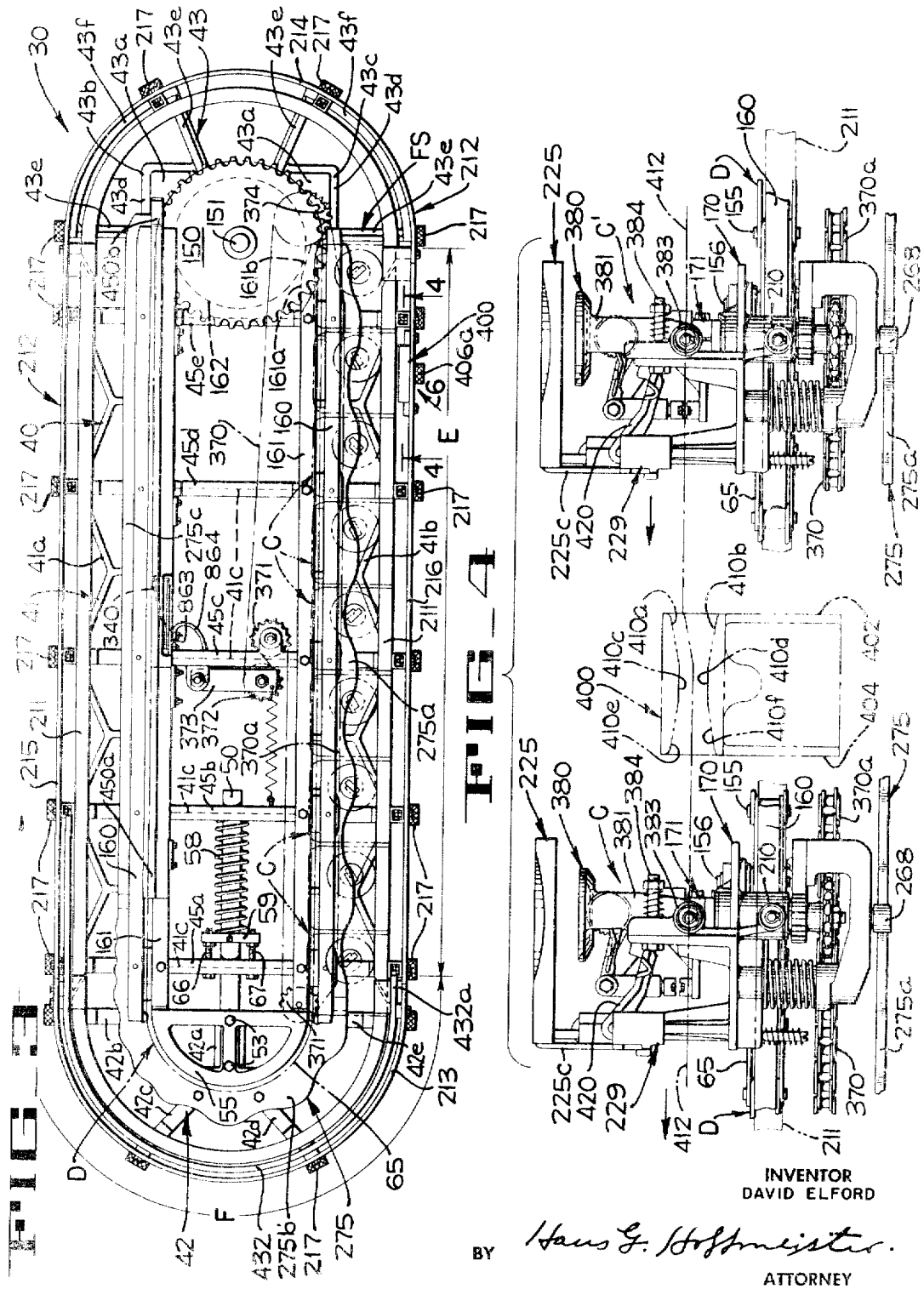

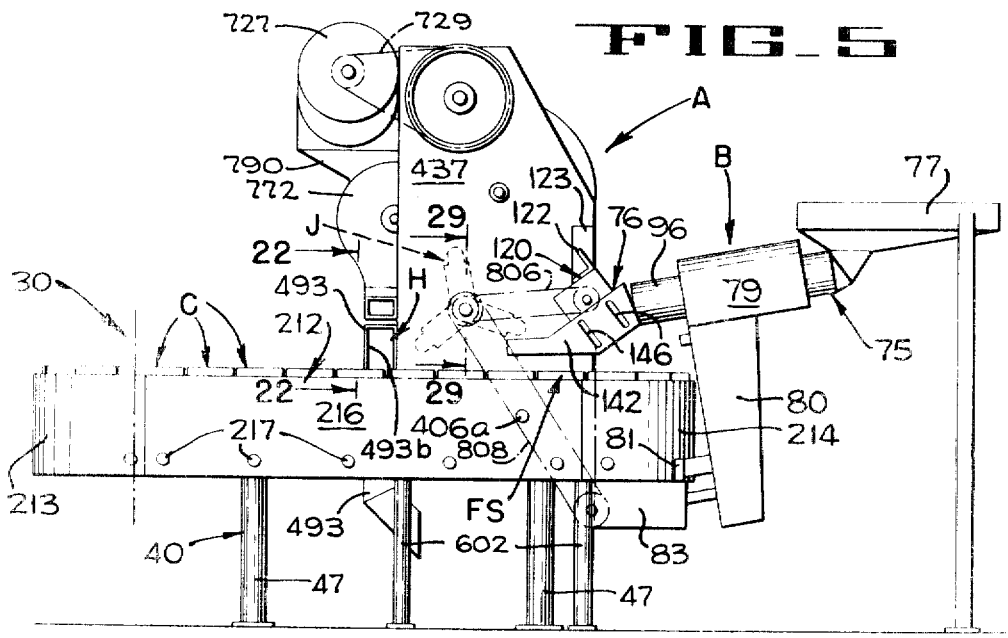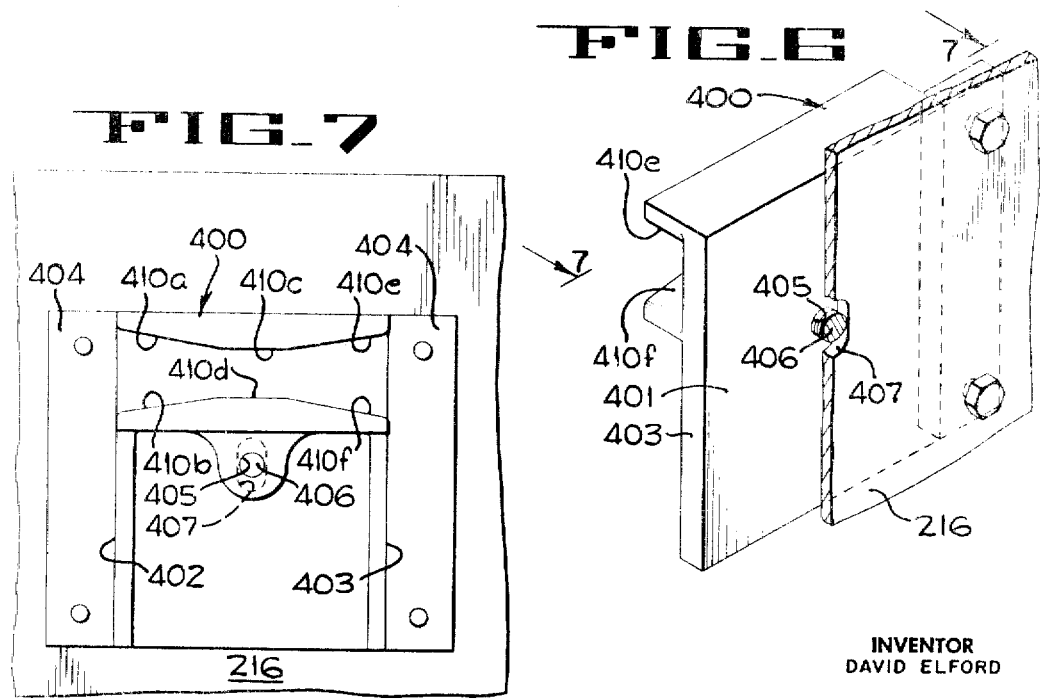

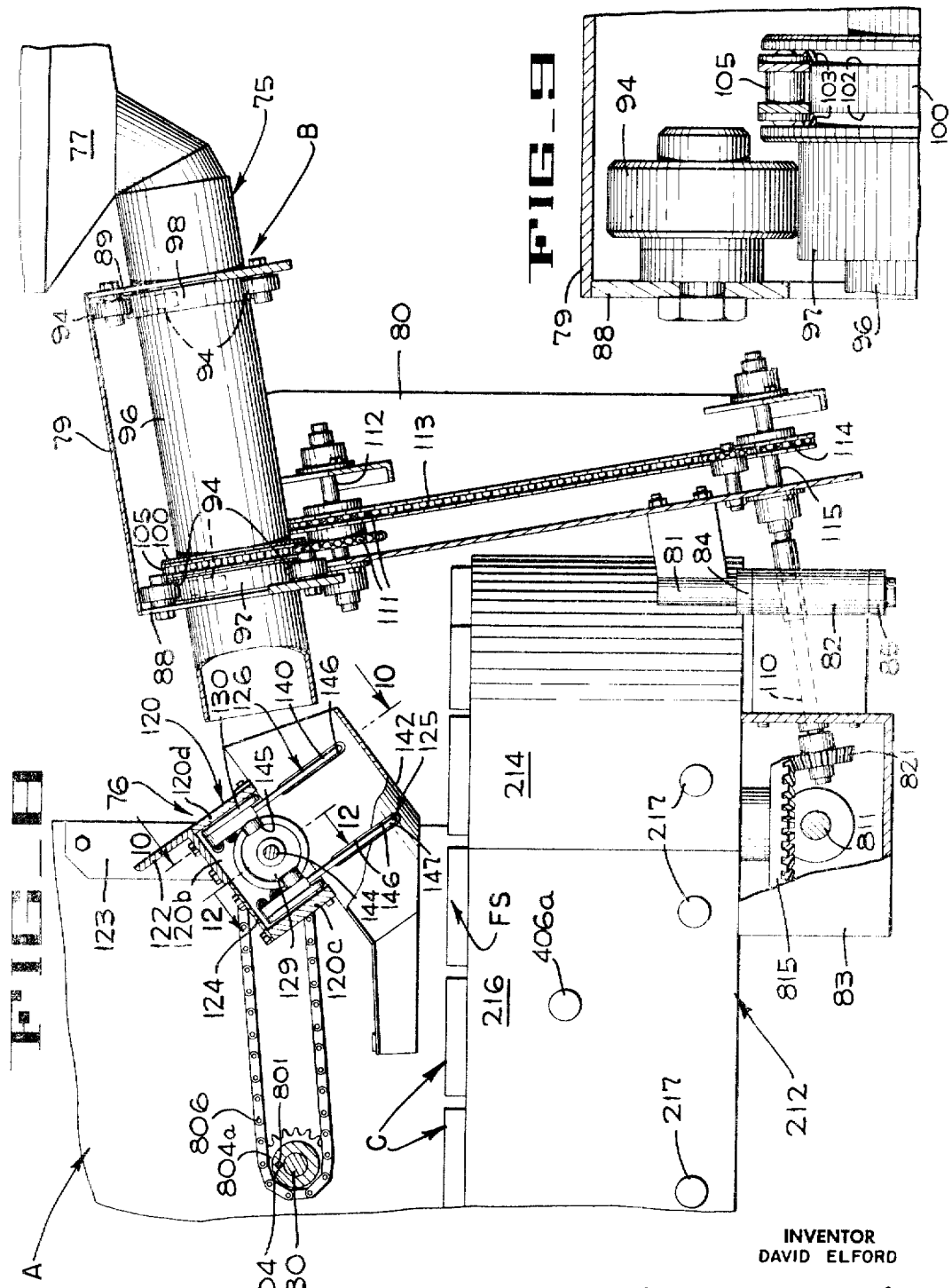

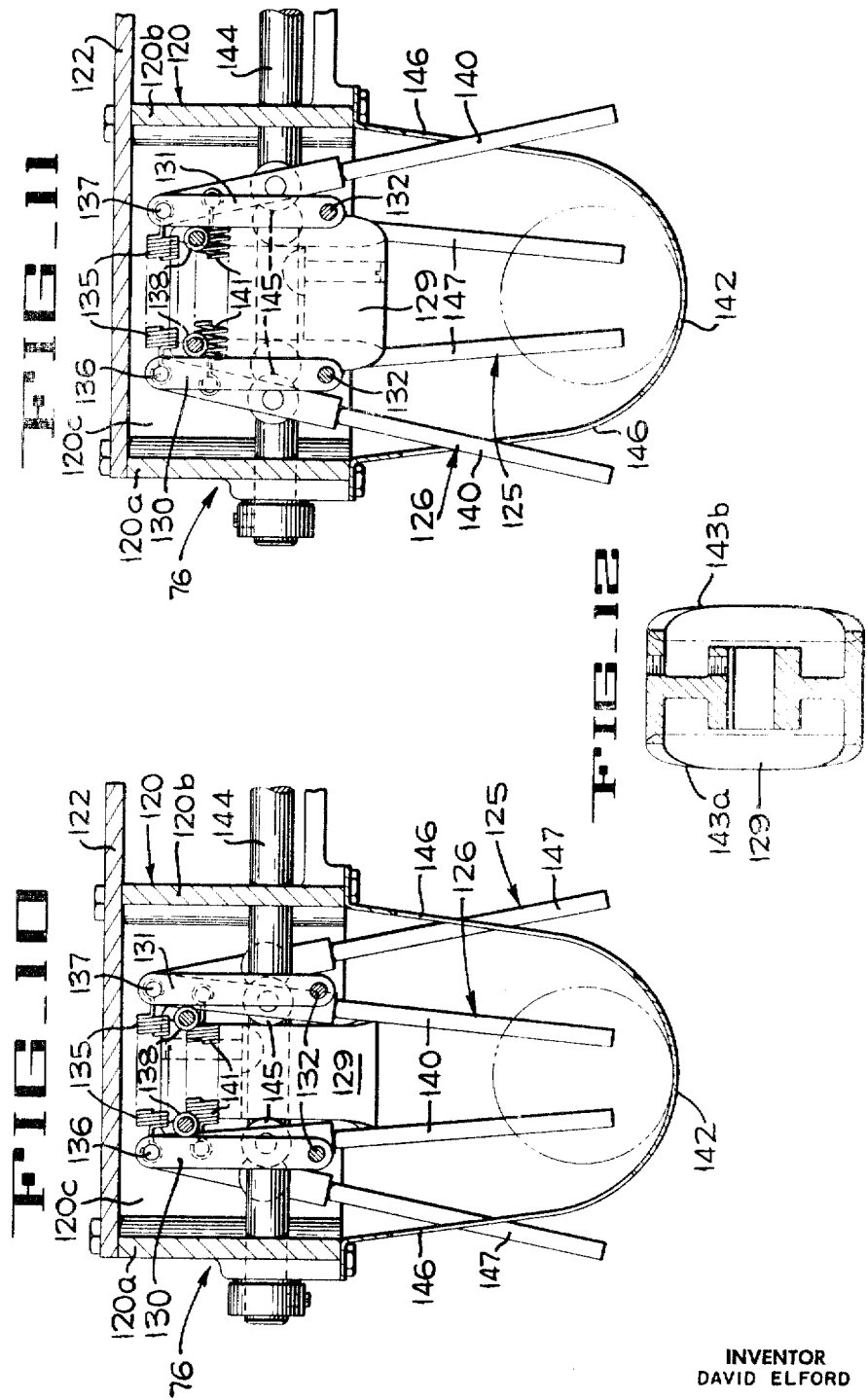

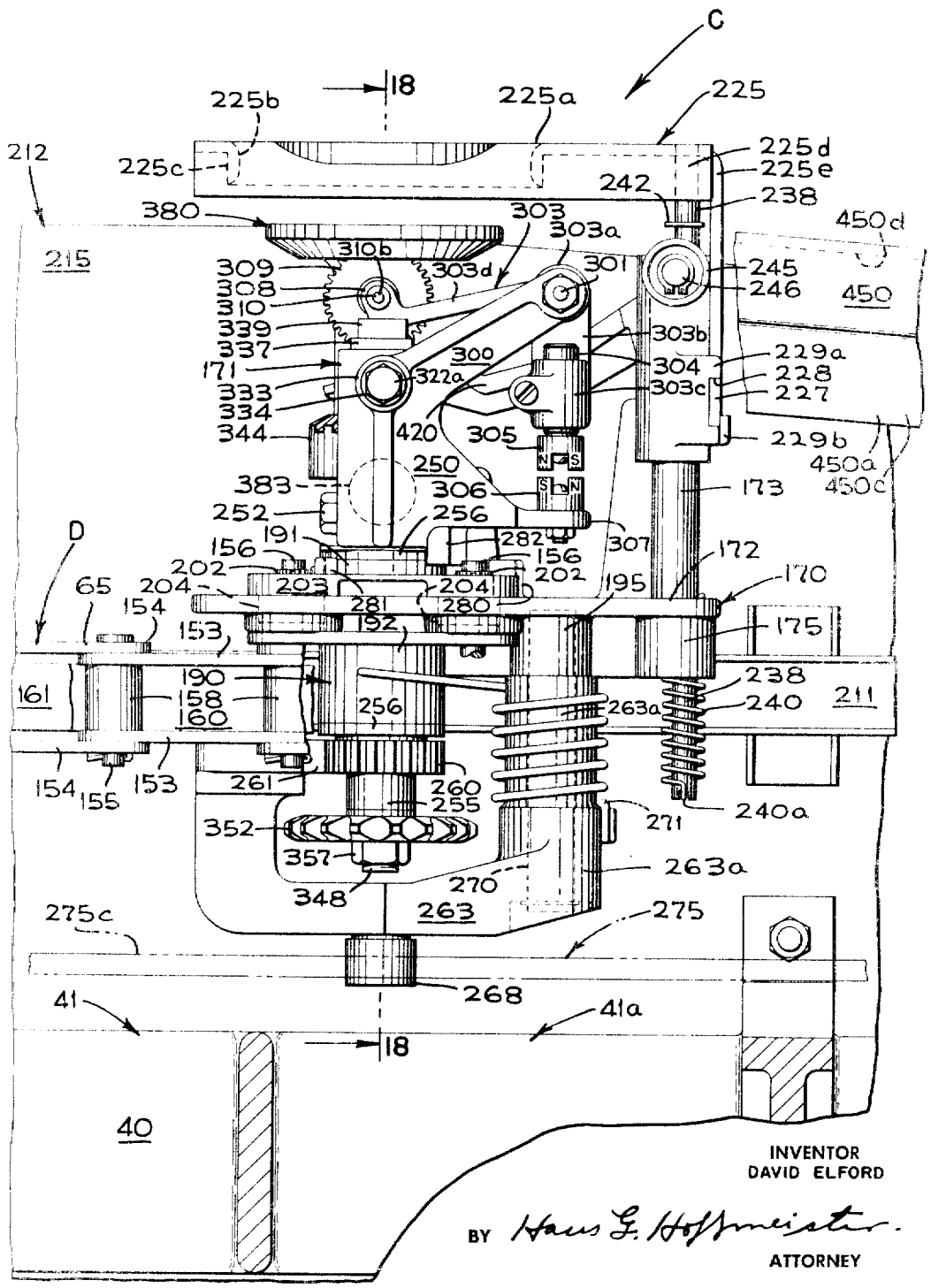

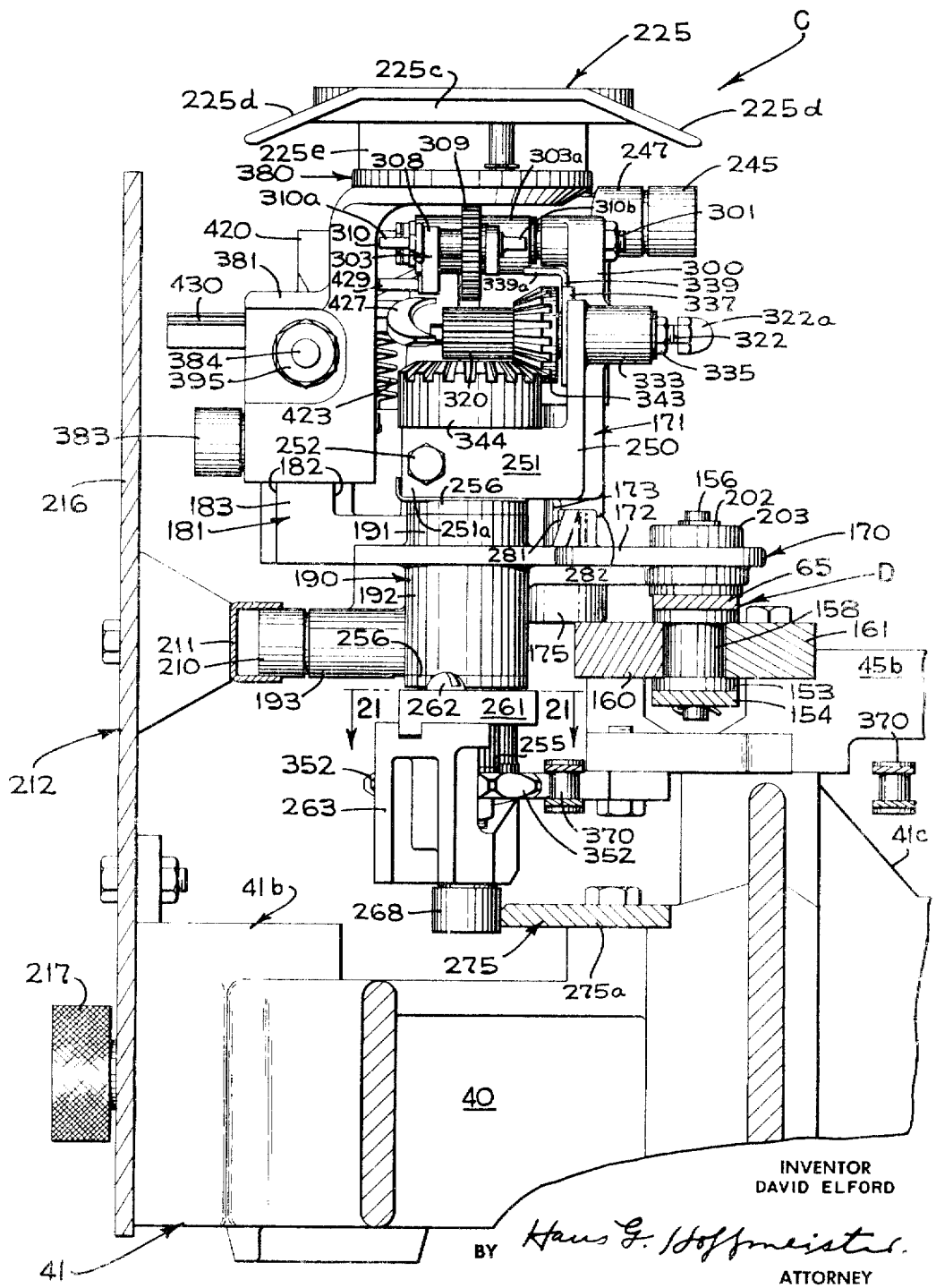

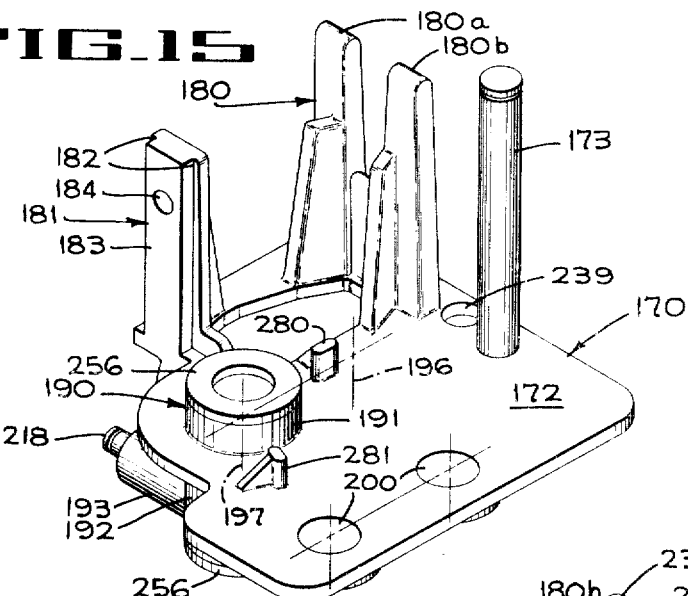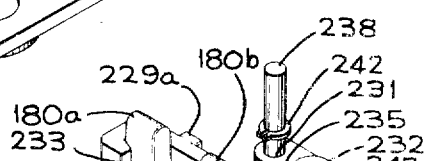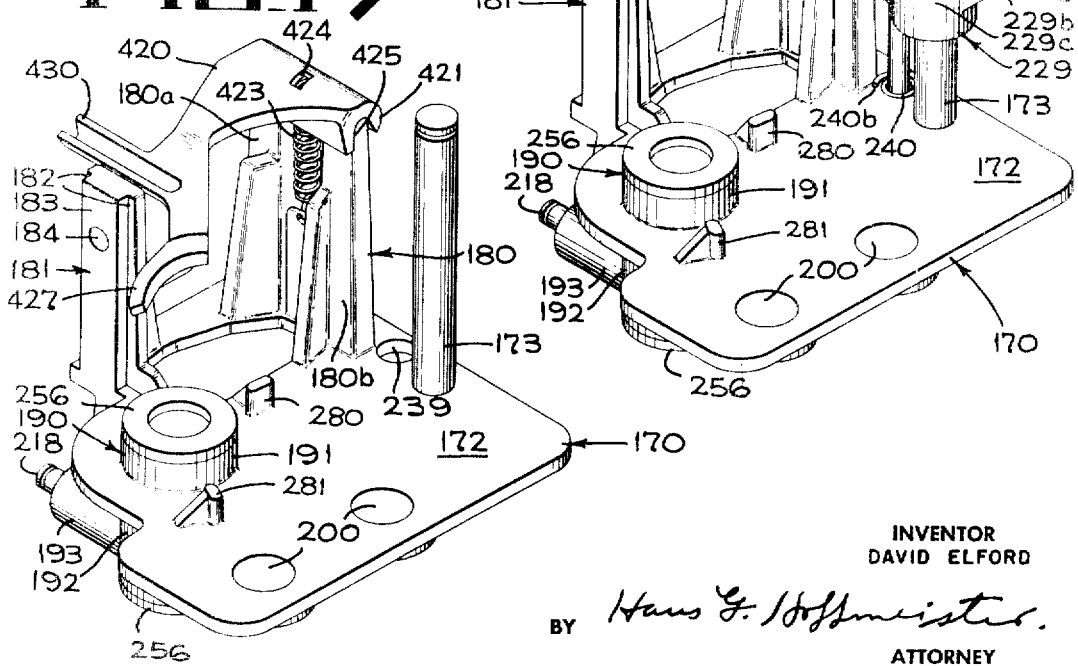

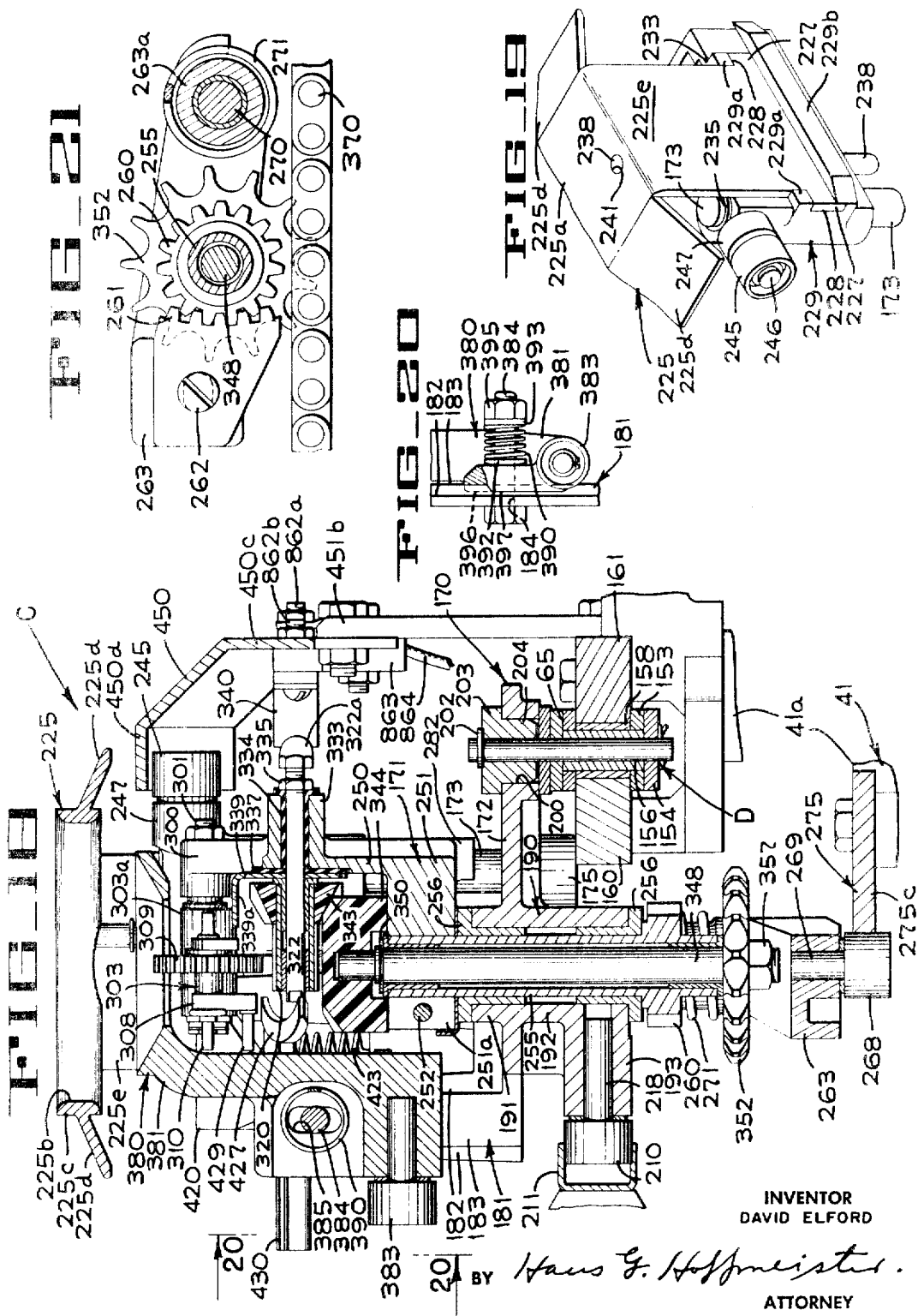

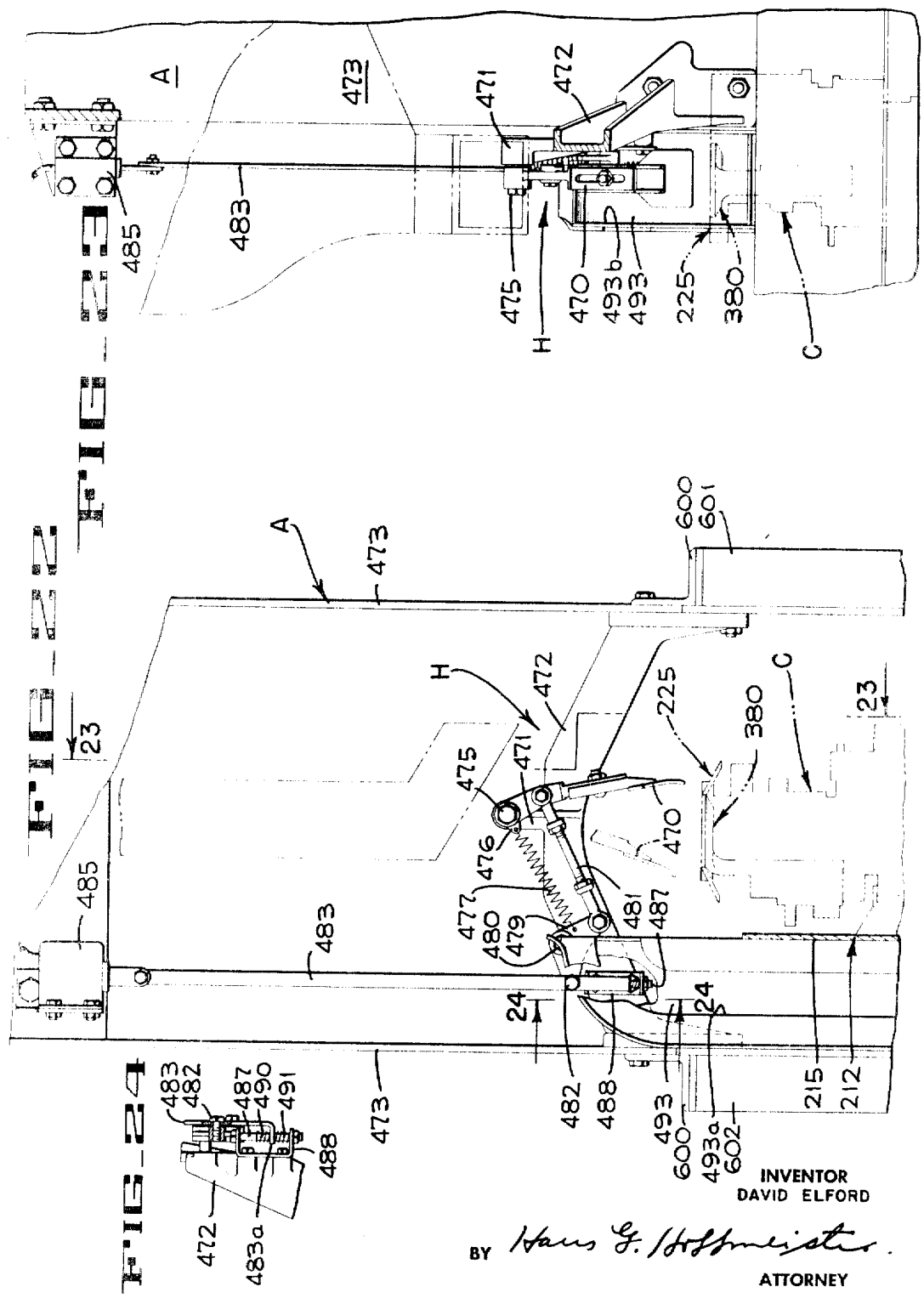

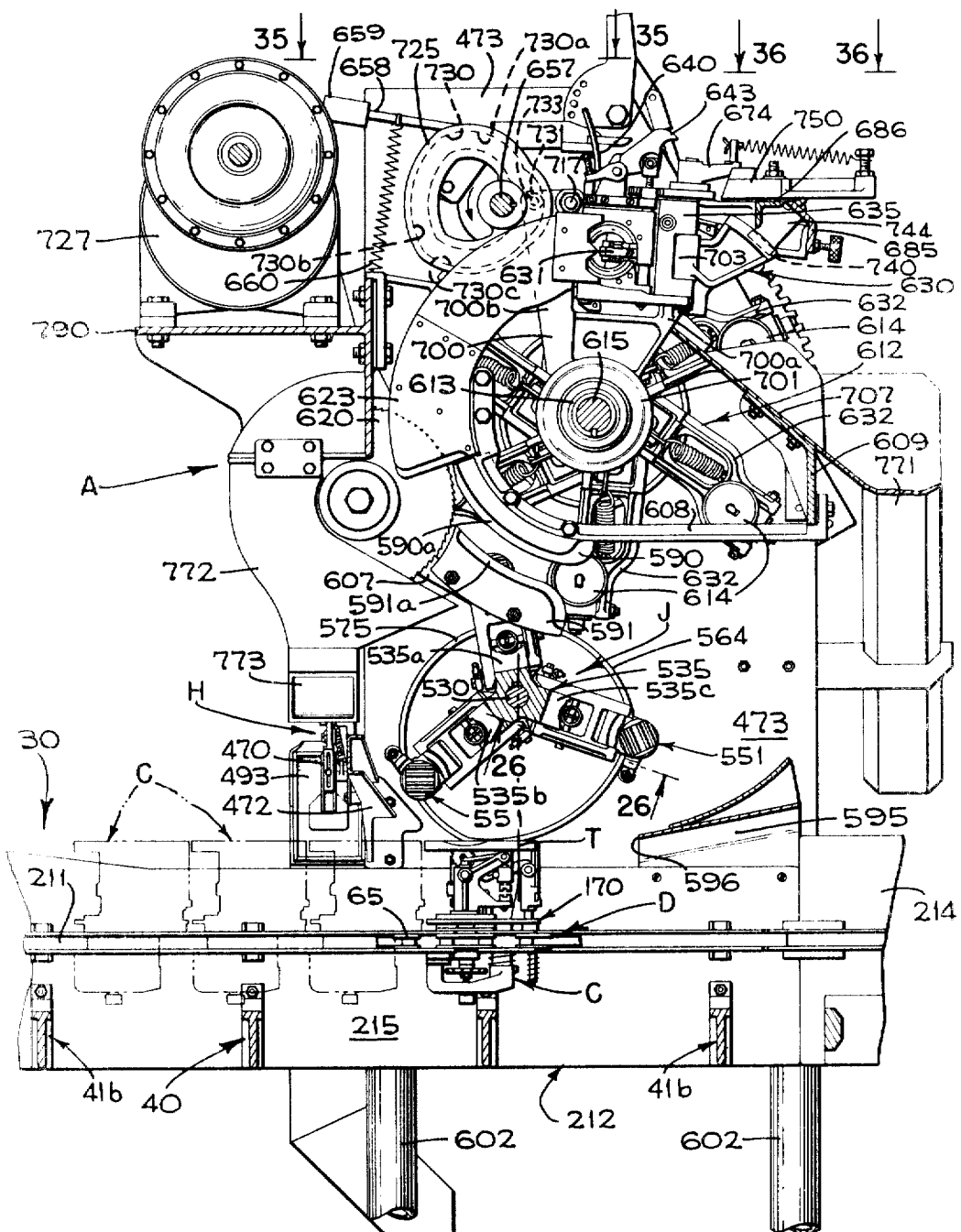

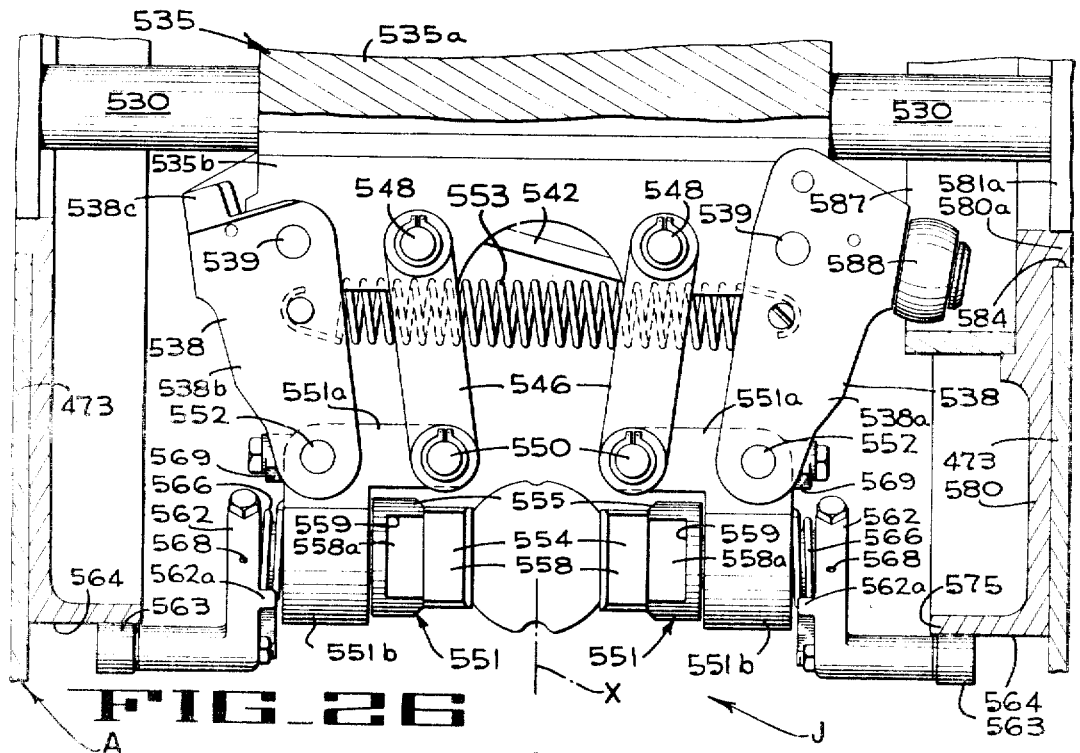
FIG_26
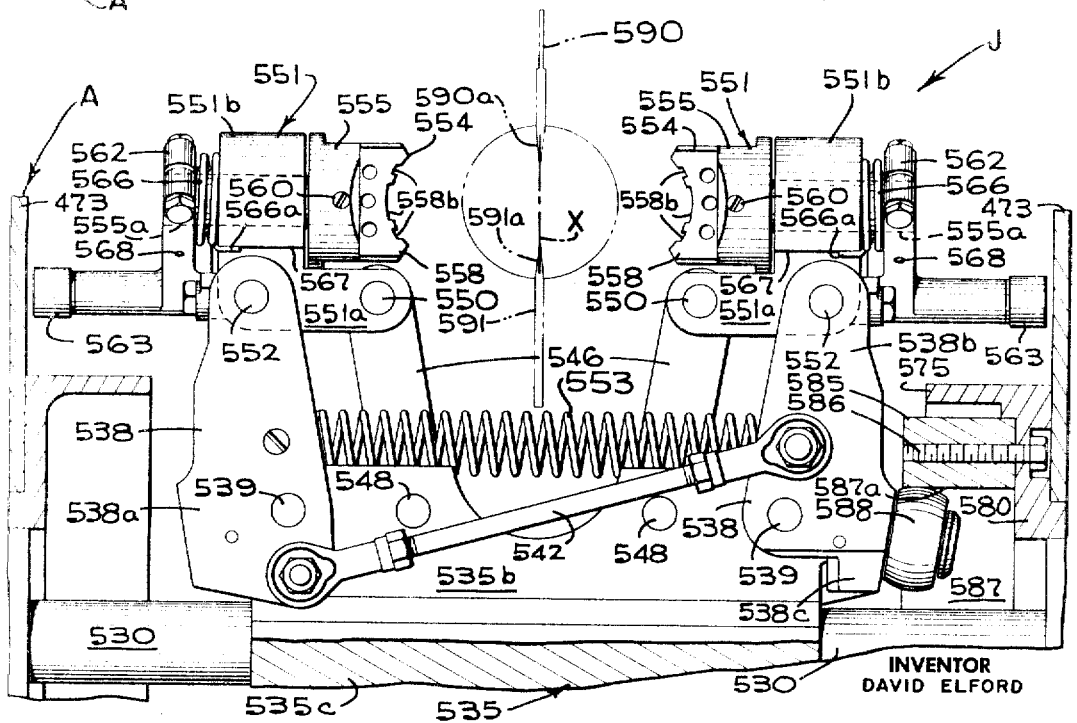
FIG_27

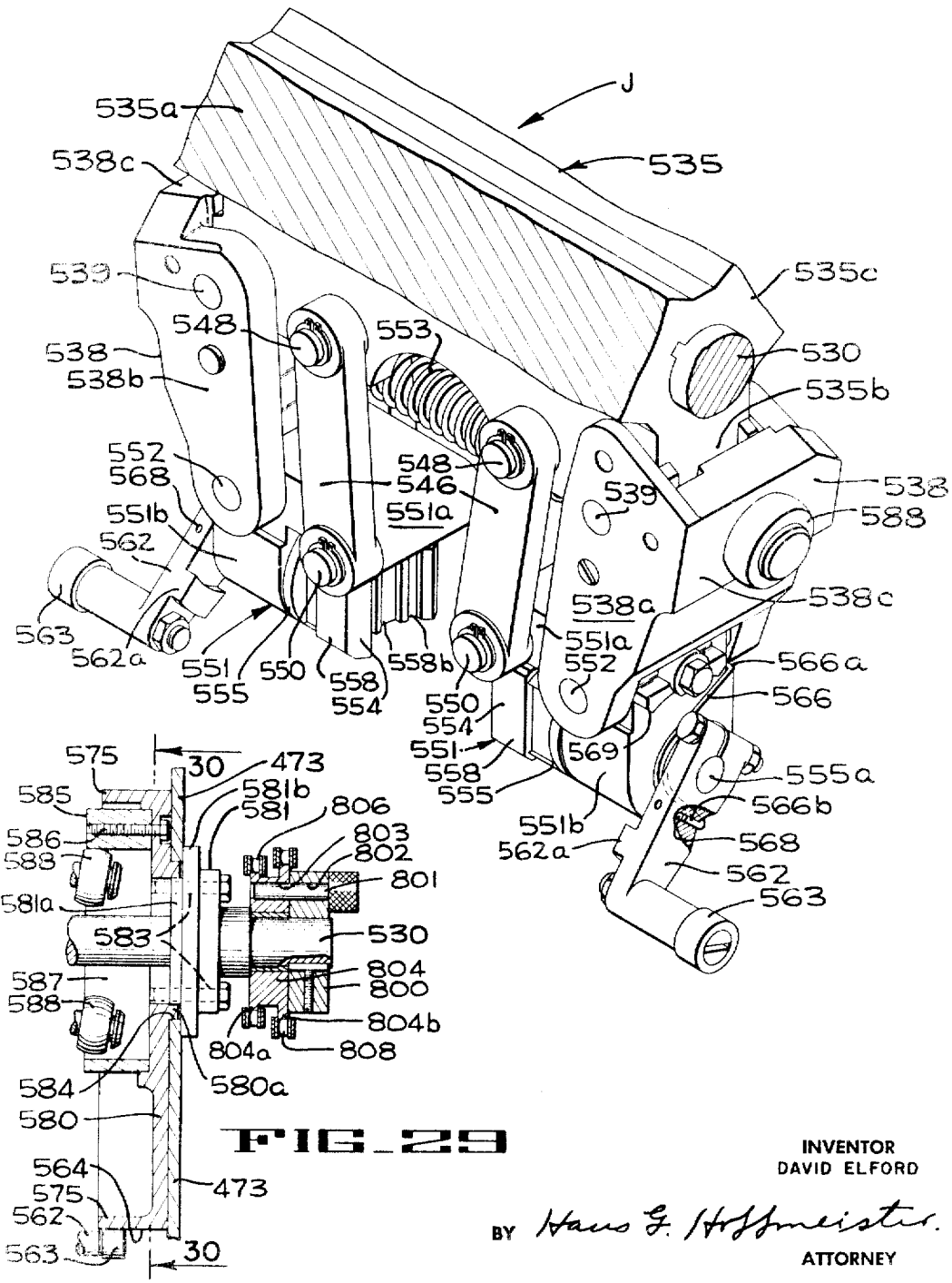

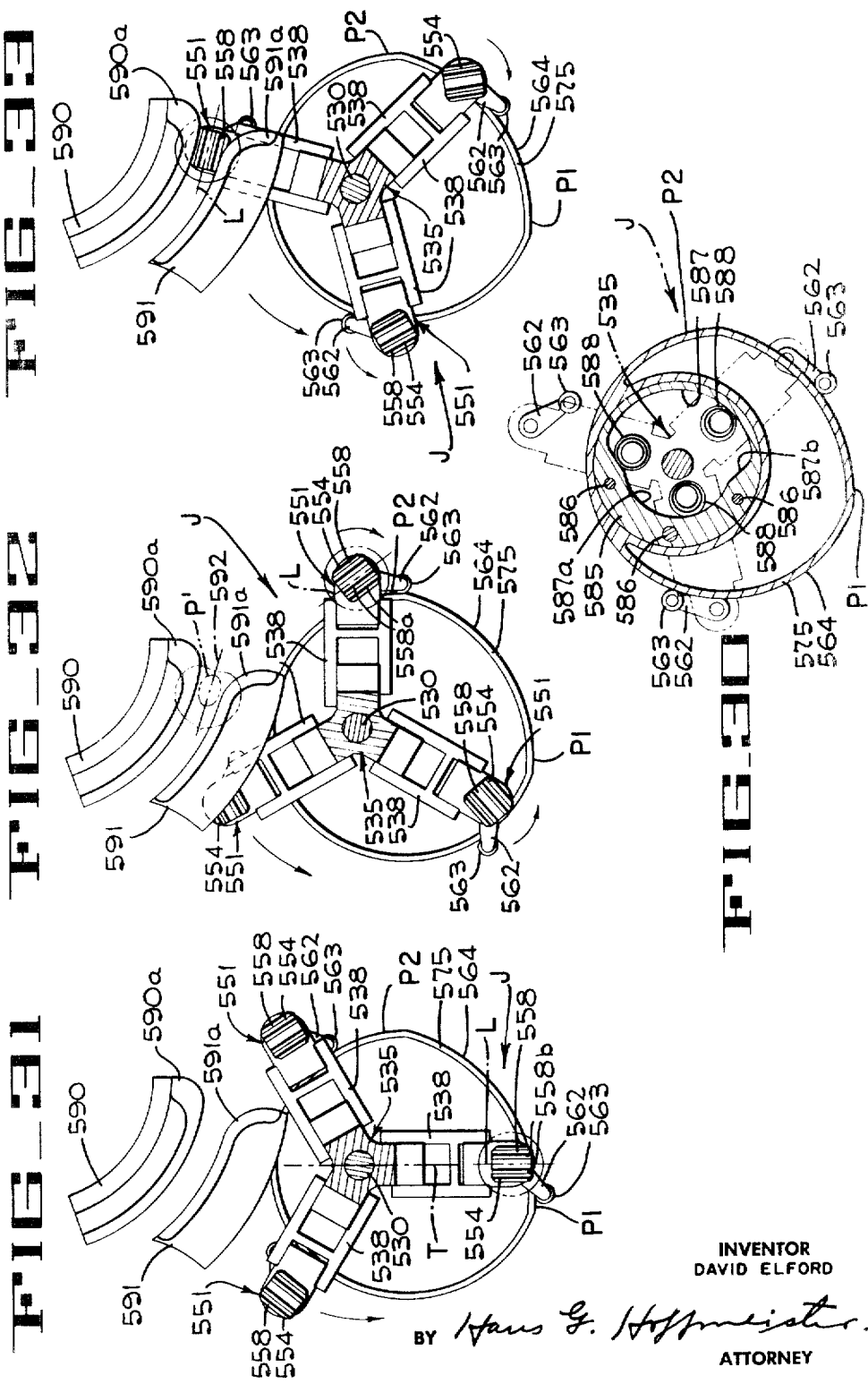

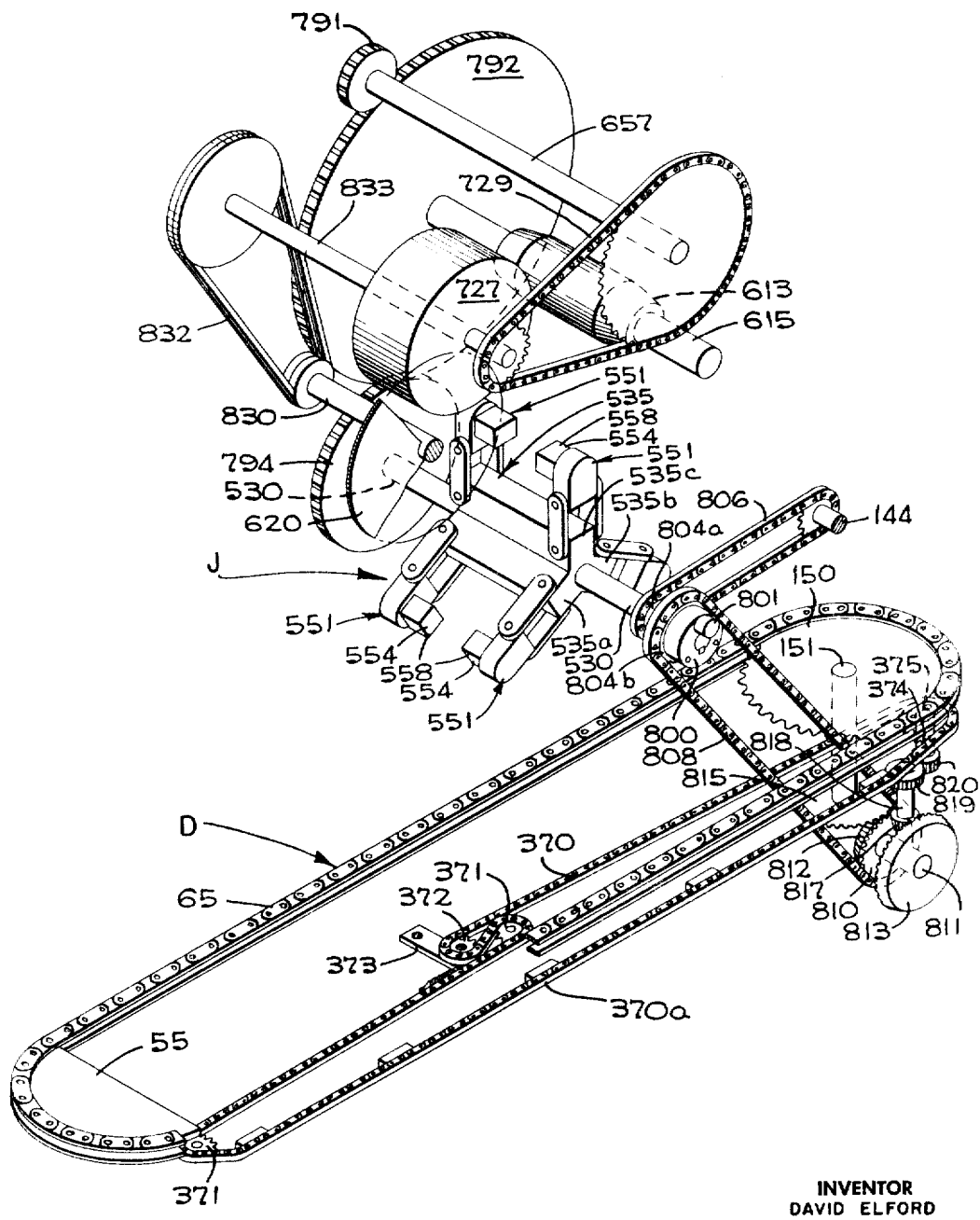

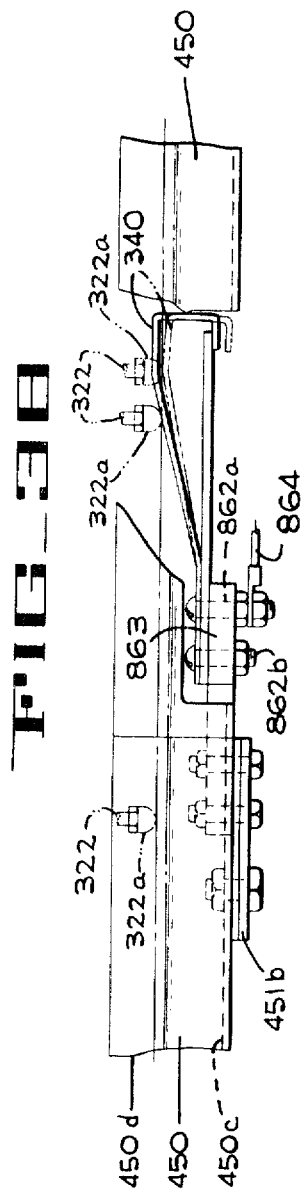
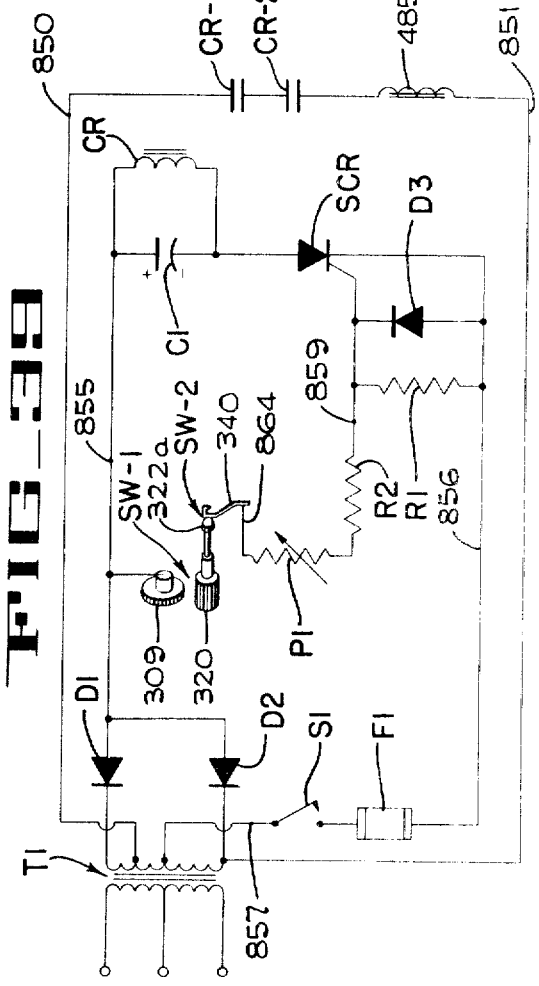

United States Patent Office 3,310,152
Patented Mar. 21, 1967

3,310,152
FRUIT HANDLING APPARATUS
David Elford, The Patch, Victoria, Australia, assignor to FMC Corporation, San Jose, Calif., a corporation of Delaware
Filed Jan. 21, 1965, Ser. No. 426,745
14 Claims. (Cl. 198—33)

This invention relates to fruit handling machines and more particularly concerns apparatus for orienting and aligning fruit, and transferring it to another machine for further processing.

When fruit, such as peaches, is automatically fed to a pitter, it is necessary that, before the fruit is moved into the pitter, it be so positioned that its suture plane and its stem-blossom axis have a particular orientation. The alignment of the suture plane and the orientation of the axis is usually obtained by rotating the fruit about a horizontal axis and oscillating it about a vertical axis as it is advanced toward the pitter. Since, on the average, a predetermined number of rotations and oscillations of fruit is necessary before the desired orientation is achieved, a predetermined length of conveyor must be provided so that a suitable percentage of fruit fed to the orienting mechanism will be properly oriented by the time it reaches the pitter. Heretofore, single-file straight-line conveyors have been used in association with the orienting mechanism and such conveyors have required an excessive amount of floor space in order to provide the required amount of travel of the fruit during the orienting process. Accordingly, it is an object of the present invention to provide a fruit orienting mechanism that provides an adequate amount of fruit travel while requiring less floor space than previous machines of this type.

Another object is to provide a fruit orienting apparatus that is compact, and provides maximum accessibility for servicing and for manual manipulation of fruit being processed thereon.

Another object is to provide an improved apparatus for effecting the adjustment of the height of fruit support members of the orienting mechanism so that changes in the position of such members may be quickly and accurately made to accommodate a change in the size of fruit being processed.

Another object is to provide an improved mechanism for feeding fruit to an orienting machine.

Another object is to provide a means for removably locking a centering ring on a fruit carriage.

Another object is to provide an improved reject mechanism for an orienting mechanism.

Another object is to provide a novel carriage for a fruit orienting apparatus.

Another object is to provide an improved drive mechanism having removable means for selectively establishing a drive connection between the orienting mechanism and the associated pitter, whereby either mechanism may be disconnected from and operated separately from the other.

Another object of the present invention is to provide a machine having a fruit conveyor and a fruit transfer unit so arranged that, although there is operative cooperation between the units, no parts of the conveyor or transfer unit travel along identical paths and, accordingly, no interference contact can be made between these mechanisms even if the mechanisms become out of adjustment.

Another object of the present invention is to provide a fruit processing apparatus capable of feeding fruit automatically to an orienting mechanism, orienting the fruit, transferring the fruit to a pitter, and efficiently pitting the fruit.

Other and further objects and advantages of the present invention will be apparent from the following description taken in connection with the accompanying drawings in which:

FIGURE 1 is a more or less diagrammatic plan of the fruit feeding, orienting, transferring, and pitting machine of the present invention.

FIGURE 2 is an enlarged, fragmentary diagrammatic section taken along lines 2—2 of FIGURE 1.

FIGURE 3 is a diagrammatic plan of the machine of FIGURE 1 with the pitter and parts of the orienting mechanism removed.

FIGURE 4 is a fragmentary side elevation of a portion of the orienting mechanism, the view being taken looking in the direction of arrows 4—4 of FIGURE 3 and particularly showing the cam mechanism for automatically adjusting the height of the fruit support members of the carriages.

FIGURE 5 is a diagrammatic side elevation, taken looking in the direction of arrows 5—5 of FIGURE 1.

FIGURE 6 is an enlarged diagrammatic perspective of a portion of the side wall of the frame of the machine, the view being taken looking in the direction of arrow 6 in FIGURE 3.

FIGURE 7 is a fragmentary side elevation, looking in the direction of arrows 7—7 of FIGURE 6, particularly showing the cam which is adapted to automatically adjust the position of each fruit support ring of the orienting apparatus.

FIGURE 8 is an enlarged section taken along line 8—8 of FIGURE 1, with a supply hopper being added to this view.

FIGURE 9 is a fragmentary enlarged view of a portion of the apparatus shown in FIGURE 8.

FIGURE 10 is an enlarged section taken along line 10—10 of FIGURE 8.

FIGURE 11 is an enlarged section similar to FIGURE 10 but showing a different operating position of the feed mechanism.

FIGURE 12 is an enlarged section taken along line 12—12 of FIGURE 8.

FIGURE 13 is an enlarged section with parts broken away, taken substantially along line 13—13 of FIGURE 1.

FIGURE 14 is an enlarged section taken along line 14—14 of FIGURE 1.

FIGURES 15, 16 and 17 are schematic perspectives of part of a carriage of the fruit orienting mechanism.

FIGURE 18 is an enlarged section taken along line 18—18 of FIGURE 13.

FIGURE 19 is an enlarged fragmentary perspective of a portion of the carriage shown in FIGURE 18.

FIGURE 20 is a fragmentary side elevation taken looking in the direction of arrows 20—20 of FIGURE 18.

FIGURE 21 is a fragmentary section taken along line 21—21 of FIGURE 14.

FIGURE 22 is an enlarged vertical section taken along line 22—22 of FIGURE 5.

FIGURE 23 is a section taken along line 23—23 of FIGURE 22.

FIGURE 24 is a vertical section taken along line 24—24 of FIGURE 22.

FIGURE 25 is an enlarged vertical section taken along line 25—25 of FIGURE 1.

FIGURE 26 is an enlarged vertical section taken along line 26—26 of FIGURE 25 but showing the mechanism in a different operating position from that indicated by line 26—26.

FIGURE 27 is a section similar to FIGURE 26 but showing the jaws in peach-releasing position.

FIGURE 28 is an enlarged fragmentary perspective of a portion of the fruit transfer mechanism.

FIGURE 29 is an enlarged fragmentary section taken along line 29—29 of FIGURE 5.

FIGURE 30 is a reduced section taken along lines 30—30 of FIGURE 29.

FIGURES 31, 32 and 33 are a series of diagrammatic operational views of the transfer mechanism and the cam that causes rotation of the gripper elements of the transfer mechanism.

FIGURE 34 is an enlarged perspective of the pitting head used in the pitter.

FIGURE 35 is a fragmentary vertical section extending longitudinally of the machine, the section being taken in the area indicated by arrows 35—35 of FIGURE 25, the parts indicated in FIGURE 35 being oriented in an opposite direction from the direction of orientation of the parts of FIGURE 25.

FIGURE 36 is a fragmentary top plan of a portion of the pitter actuating mechanism, the view being taken in the area of arrows 36—36 of FIGURE 25 looking downwardly at the apparatus which faces in an opposite direction from the direction it faces in FIGURE 25.

FIGURE 37 is a diagrammatic perspective of the drive train of the machine of FIGURE 1.

FIGURE 38 is an enlarged fragmentary plan taken looking in the direction of arrows 38—38 of FIGURE 2.

FIGURE 39 is a diagram of the electric control circuit of the reject mechanism.

General description

The fruit processing machine 30 (FIG. 1) of the present invention operates to orient spherical or spheroidal fruit such as peaches, apricots and certain species of apples so as to dispose the fruit with its stem-blossom axis vertical and with its stem indent in a downwardly facing position. In handling sutured fruit such as peaches and apricots, the machine 30 orients the fruit not only as to stem indent but also as to suture plane so that the fruit can be transferred from the orienting mechanism to a machine for further processing in the proper position to enable the machine that receives the fruit to function to the best advantage. For example, the processing machine 30 is illustrated in FIGURE 1 as being operatively associated with a peach pitter A (FIG. 5) of well-known design, which, after cutting both the flesh portion and the pit portion of a peach in half, severs each pit half from its associated half of the flesh portion. Consequently, the machine 30 of the invention will be considered herein as being intended to orient peaches, although it is to be understood that with little or no alteration and/or adjustment, it is likewise adapted to handle other fruit.

In order for the apparatus of the pitting operation to meet the specifications required for prime quality canned peach halves, it is necessary for the peaches to be bisected along, or at least immediately adjacent, the suture plane of each peach. It is because of this requirement that it is desirable to deliver each peach to the pitting machine A so oriented that the bisecting saw of the pitting machine will sever the peach in a plane either coinciding with or immediately adjacent and parallel to the suture plane of the peach. The machine 30 of the invention is adapted to orient peaches both as to stem indent location and as to suture plane alignment, and to deliver the peaches to a peach pitter in the optimum position for proper operation of the latter, with a high degree of efficiency and with a high percentage of accurately oriented peaches.

The machine 30 of the invention receives peaches in random positions and one at a time in rapid succession from a feed mechanism B (FIG. 1) that it is arranged and synchronized with the machine 30 to deposit one peach in each of a series of carriages C that are progressed in rapid succession through the machine 30 by an endless chain carriage conveyor D which is indicated by a center line in FIGURE 3. The fruit is thus advanced from the feed station FS successively through a zone E where it is oriented to dispose its stem-blossom axis vertical and its stem indent in a downwardly facing position, through a zone F where it is turned to align its suture plane with the direction of carriage advance, and to a transfer station, that is located approximately at the point indicated by phantom line G, where each fruit that has been properly oriented is picked up by a transfer mechanism J (FIG. 5), turned through a predetermined angle, and delivered to the pitting machine A without disturbing the alignment of the suture plane of the fruit with the direction of carriage advance. A reject mechanism H (FIG. 22) adjacent the transfer station G on the upstream side thereof is effective to remove improperly oriented fruit before it reaches the pickup mechanism J.

Support structure

The machine 30 includes a rigid, stationary support base 40 (FIGS. 3 and 5) which supports the operating parts of the machine and positions the carriers C at an elevation approximately 3 feet from the floor so that they are at a height convenient for an operator who has occasion to inspect or manipulate fruit in the carriers. The base 40 may take many forms and is herein shown as comprising a central member 41, and two end members 42 and 43, all three members being aluminum castings. The central member 41 is a onepiece casting which includes two elongate open-framework side members 41a and 41b and a plurality of transversely extending members 41c, the longitudinal centerlines of which are indicated generally by dotted lines 41c in FIGURE 3. Auxiliary support bridges 45a–45e are bolted to the side members 41a and 41b in overlying relation to the transverse members 41c of the member 41. The side members 41a and 41b and the bridges 45 have certain structural features, such as support surfaces, that are particularly designed to accommodate and interposition other parts of the machine, and these features will be described in connection with the description of said other parts. A plurality of legs 47 (FIG. 5) are secured to the base 40 in any conventional manner, as by bolting flanges, formed on the legs, to flanges formed on the base 40.

The end casting 42 includes a central longitudinally extending hub 42a and four outwardly projecting arms 42b, 42c, 42d and 42e, arms 42b and 42c being connected at their outer ends by arcuate end members (not shown), and the ends of arms 42d and 42e being similarly joined. The entire end casting 42 is supported by a shaft 50 which is slidably journalled in bushings fixed in hubs formed on the underside of the support bridges 45a and 45b. The casting 42 is secured to the shaft 50 by capscrews 53 which also secure an arcuate chain guide 55 to the casting 42. A compression spring 58 is disposed between the bridge 45b and a collar 59 secured to the shaft 50, and is effective to urge the end casting 42 toward the left (FIG. 3). The endless chain 65 of conveyor D is trained around and is held against the arcuate edge portion of the chain guide 55. Accordingly, the spring loaded end casting 42 is, in effect, an automatic chain tightener. A pair of screws 66 and 67, which are threaded in collar 59 and locked therein by lock nuts, extend freely through guide holes in the bridge 45a. By adjusting the screws in the collar 59, the distance the head of each screw is spaced from the bridge 45a can be adjusted and this clearance will restrict the amount of movement toward the right (FIG. 1) of the chain if a force is generated tending to move the chain in that direction.

The end member 43 comprises a box-like casting 43a, which has a flat edge portion bolted to the bridge 45e, and two corner castings 43b and 43c that are bolted to the box casting 43a. Each of the corner castings includes an angle member 43d, two arms 43e, and an arcuate member 43f joining the ends of the arms.

Feed mechanism B

The feed mechanism includes a feed chute 75 (FIG. 8) and a timing mechanism 76. The feed chute 75 is adapted to receive fruit received in random order from a bulk feed hopper 77, arrange the fruit in single file, and deliver it to the timing mechanism. The feed chute includes a fixed guide housing 79 that is mounted on the upper end of a four-sided vertically extending bracket 80 to the lower end of which is secured a post 81 that is adapted to be disposed in a guide sleeve 82 bolted to a part 83 of the support structure of the machine. Set collars 84 and 85 secured to post 81 hold the bracket 80 in fixed position. The fixed guide housing 79 includes two annular end walls 88 and 89, and three rotatable rollers 94 mounted on each end wall in a circular pattern to define a roller guideway. A tube 96, which is disposed within the housing 79, has two annular tracks 97 and 98 welded thereto, each track being in engagement with the three rollers 94 of one of the guideways. A drive ring 100 (FIG. 9) is formed integral with the annular track 97 and is provided with annular grooves 102 which receive rubber O-rings 103. A chain 105 (FIG. 8) is trained around the drive ring 100, the inner surface of the chain being in driving engagement with the O-rings. The chain 105 is driven from a power driven shaft 110 by means of a double sprocket 111 keyed to a rotatable shaft 112, a chain 113, and a sprocket 114 that is keyed to a rotatable shaft 115 which is coupled to shaft 110. When shaft 110 is rotated, the tube 96 rotates and the fruit therein is tumbled as it moves down the tube, whereby it automatically assumes a single file formation.

The timing mechanism 76 includes a housing 120 that has side walls 120a and 120b (FIG. 10) and end walls 120c and 120d (FIG. 8), all secured together to form a rigid unit. The housing is supported in fixed position by an angle bar 122 that is secured to the side walls 120a and 120b and is secured by means of a bracket 123 to a side wall of the pitter machine A. The angle bar 122 closes a portion of the open top of the housing, and a cover plate 124 closes the rest of the top of the housing. Mounted inside the housing 120 are two gates 125 and 126, the upper gate 126 being arranged to receive the line of peaches from the feed tube 96 and deliver them one at a time to the lower gate 125 which, in turn, permits the discharge of one peach into each carriage. The two gates are substantially identical except that they are oppositely disposed to permit mounting on the opposite end walls of the housing 120 and to adapt the gates for actuation by a common control cam 129. Accordingly, only the upper gate 126 will be described in detail.

The gate 126 includes a pair of mounting arms 130 and 131 (FIG. 10), each of which has a pin 132 at its lower end pivotally mounted in the upper end wall 120d of the housing. A spring 135 is connected between pins 136 and 137 projecting from the upper ends of the arms 130 and 131 respectively to pivot the arms toward each other until they abut stop rollers 138 mounted on the housing wall 120d. A pair of stop fingers 140 are pivotally mounted, one on each of the pins 136 and 137, said fingers extending downwardly into a guide chute 142 that is secured to the lower end of the housing 120.

The fingers 140 are swung, against the resistance of a spring 141 connected between the fingers, from an adjacent fruit-arresting position shown in FIGURE 10 to a spaced-apart fruit-release position shown in FIGURE 11 by the cam 129 that is keyed to a shaft 144 and engages a roller follower 145 on each finger. The cam is a generally cylindrical member having two identical lobes 143a and 143b (FIG. 12) that are disposed at opposite ends of the cam but in the same angular sector of the cam, each lobe extending over about 210° of the periphery of the cam. Since the lobes are in the same angular sector of the cam, they will simultaneously engage and actuate the rollers 145 on the fingers 140. Thus, when the cam is in the position of FIGURE 10, the rollers 145 are not in contact with the lobes and therefore the spring 141 pulls the fingers inwardly to the fruit-arresting position. When the cam is in the position of FIGURE 11 the rollers 145 have been contacted by the lobes, and the fingers 140 have been swung to the fruit-release position, passing part way through vertical slots 146 in the guide chute 142.

Referring to FIGURE 8, it will be seen that, since the lobes extend over only about 210° of the periphery, they actuate the fingers of the upper and lower gates alternately, i.e., when the fingers 140 of the upper gate are open, the fingers 147 of the lower gate are closed, and vice versa. In general, during operation, while the lower gate is closed, the upper gate is opened, permitting a peach to move down the chute into engagement with the lower gate. The upper gate is then closed as the lower gate is opened to discharge the peach into a carriage C. Of course, the opening of the lower gate is coordinated with the movement of the carriages so that each peach will be deposited accurately in the centering ring of each carriage.

*Carriage conveyor D*

The carriage conveyor D includes the endless chain 65, the chain guide 55, and a sprocket 150 (FIG. 3) that is keyed to a shaft 151 which is driven in a manner to be described hereinafter. The chain 65 (FIG. 13) includes conventional inner and outer rigid plates 153 and 154 pivotally connected together on pivot pins. The arrangement is such that every third pivot pin 155 is of normal length while the first and second pins 156 are extra long to provide means for connecting the carriages C to the conveyor. A roller 158 is rotatably disposed on each of the pivot pins, which are secured in place in a conventional manner, as by riveting, cotter pins or spring clips. As seen in FIGURE 14, each roller 158 is disposed between spaced guide bars 160 and 161 which are secured to end portions of the bridges, the positioning of the guide bars on one end of bridge 45b being shown in FIGURE 14. The extent of the guide bars 160 and 161 on each side of the machine is shown in FIGURE 3 where it will be noted that the left end of each of the inner bars 161 fits in a groove (not shown) in the adjacent end surface of the chain guide 55 while the right end of each bar 161 has a stepped construction with a lower portion 161a disposed in a groove 162 provided in the periphery of sprocket 150. The lower portion 161a is provided with a slanted edge 161b. At the feed end of the machine, the chain is held in a horizontal plane by the engagement of the chain with the teeth of the sprocket 150. At the other end, the rollers 158 roll along the curved outer surface of the chain guide 55 with the side edges of the plates 153 and 154 overlying the upper and lower edges of the chain guide at the outer curved edge portion.

*Carriages C*

As seen in FIGURES 13 and 14, each carriage includes a base 170 to which the chain 65 is connected and an upper finder gear support member 171. The base 170 includes a flat plate 172 (FIG. 15) having at its forward edge portion a cylindrical post 173 secured, as by a press fit, in an aperture that extends through the plate 172 and part way through a cylindrical boss 175 (FIG. 13) formed on the underside of plate 172. A U-shaped mounting bracket 180 (FIG. 15) having spaced arms 180a and 180b is integrally formed with plate 172 and projects upwardly therefrom alongside post 173. Also formed on the upper surface of plate 172 is a second post 181 that has longitudinal recesses 182 provided along two side edges so that the portion between the recesses forms a vertically extending tongue 183 which has a hole 184 therein. By comparing FIGURES 15 and 18, it will be seen that a cylindrical sleeve 190 which is formed in the plate 172, has an upper portion 191 and a lower portion 192 from which a tubular boss 193 projects laterally. A cylindrical hub 195 (FIG. 13) is integrally formed on the lower surface of the plate 172, the axis 196 (FIG. 15) of the hub 195 being in alignment longitudinally of the plate 172 with the axis 197 of the cylindrical sleeve 190.

Along one side of plate 172 two cylindrical apertures 200, which are aligned longitudinally of the plate 172, are formed. As seen in FIGURE 18, one of the long pins 156 of the conveyor chain projects up through each aperture 200 and is locked therein by a spring retainer 202. The two snap rings 202 bear against the upper surface of a positioning and locking bar 203 (FIGS. 13 and 18) that has two depending cylindrical members 204. Each cylindrical member 204 is disposed in one of the two cylindrical apertures 200 in plate 172. It will be noted that each aperture 200 is large relative to the pin 156 of the chain and, as a result, when the spring retainers 202 are removed and the locking bar 203 is lifted away from the plate 172, the carriage can then be moved to the right (FIG. 18) to remove a roller 210 from a guide channel 211. The carriage can then be lifted upwardly away from its operating position, pivoting the carriage slightly if necessary. The removal of the carriages is accomplished most easily at the ends of the machine where there are no overhead cams or drive chains in engagement with the carriage.

As seen in FIGURE 18, the side of the carriage remote from the chain is supported by the roller 210 that is disposed in the channel 211. The channel 211 is made in four sections and extends entirely around the machine, being secured by capscrews or the like to the inner surface of a four-piece side wall unit 212 (FIG. 1), which includes curved end wall members 213 and 214 and straight side wall members 215 and 216. Each wall member is removably secured to a portion of the support structure of the machine by capscrews 217, and each section of the guide channel 211 is secured to and is generally co-extensive with one of said wall members. Each of the rollers 210, that are disposed in the channel 211, is rotatably mounted on a pin 218 (FIG. 18) pressed in the tubular boss 193 of the base 170.

A fruit centering ring 225 (FIGS. 13 and 14) is mounted on the post 173 of the carriage, said ring including a flat top wall 225a which has a circular opening 225b therein that is defined by a cylindrical wall 225c projecting downwardly from the top wall. At each side, slanted wall members 225d extend downwardly from the top wall and a vertical support wall 225e projects downwardly from the forward edge of the top wall. Near its lower end the vertical wall 225e has two flanges 227 (FIG. 19) which are disposed in two sockets 228 that are formed between each of two projections 229a of a mounting member 229 and a lip 229b formed on the bracket. The mounting member 229 (FIG. 16) includes an upright portion 229c, in which two cylindrical holes 231 and 232 are provided, and a laterally projecting plate portion 233 that terminates in a hooked end which receives the arm 180a of the U-shaped bracket 180. The hole 232 in the mounting member 229 slidably receives the fixed post 173, with a snap ring 235 on post 173 limiting the upward movement of the mounting member relative to the post. The other hole 231 in the mounting member receives a rod 238 which also extends freely through a hole 239 (FIG. 16) in the carriage plate 172. A coil spring 240 (FIG. 13) encircles the lower portion of the rod 238, having a lower hooked end 240a disposed in a slot in the lower end of rod 238, and a coil 240b (FIG. 13) of enlarged diameter overlying the uppersurface of the carriage plate 172. The rod 238 also extends up through an opening 241 in the top wall 255a of the centering ring, and a pair of snap rings 242 (FIG. 16) are secured to the rod 238, one ring 242 being connected above the mounting member 229 and the other (not shown) being disposed below that member, and in engagement with the undersurface thereof to hold that member and the centering ring at the desired height.

With this arrangement, the centering ring 225 may be quickly removed from the carriage by gripping the ring 225 in one hand, engaging the top end of the rod 238 and depressing it to a point below the lower surface of the top wall 225a, and then swinging the centering ring forwardly, causing it to pivot at its lower end in the sockets 228. The ring can then be lifted away from the carriage.

A cam follower roller 245 (FIG. 16) is rotatably mounted on a shaft 246 that is fixed to and projects outwardly from a hub 247 formed on the mounting member 229.

Referring to FIGURES 14 and 18, it will be seen that the finder wheel mounting member 171 of each carriage comprises a vertical side wall 250 and a relatively thick bottom wall 251 that has a split end portion 251a clamped, by means of a bolt 252, on a vertical tubular shaft 255. The shaft 255 is rotatably journalled in bearing sleeves 256 that are disposed in the upright tubular sleeve 190 formed in the plate 172. A gear 260 is integrally formed on shaft 255 near the lower end thereof, and said gear is in mesh with a gear segment 261 (FIG. 21) which is clamped by a capscrew 262 to the upper surface of a lever 263. A cam follower roller 268 (FIG. 18) is rotatably journalled on a short shaft 269 projecting downwardly from the undersurface of the lever 263. At one end, the lever 263 (FIG. 13) has a tubular section 263a rotatably journalled on a shaft 270 that is pressed or cast in the hub 195 of the plate 172. A torsion spring 271 encircles the tubular section 263a and is operatively connected between the section 263a and the lower portion 192 of sleeve 190 for pivoting the lever 263 in a direction to urge the follower roller 268 against a cam strip 275, as seen in FIGURE 14. The cam strip is a flat strap-like member that consists of three sections 275a, 275b and 275c (FIG. 3), each strip being secured by capscrews to horizontal support surfaces formed on certain of the support arms of the support structure of the machine. An undulating cam surface is formed on the cam strip 275 so that, as each carriage is moved along by the conveyor chain, the roller 268 is moved back and forth in a direction laterally of the carriage, causing the lever 263 to pivot about the shaft 270. As the lever 263 pivots, the gear segment 261 (FIG. 21) also oscillates about the axis of shaft 270, causing the gear 260 to oscillate about the axis of the tubular shaft 255. The finder gear mounting member 171 of the carriage, which is clamped to shaft 255, also oscillates for a purpose that will be explained presently.

It will be noted that the cam is so designed that the oscillations during the time the carriage is in zone E are substantially uniform as to the amount of oscillation and as to the frequency. As the carriage approaches the end of zone F, the frequency is increased and the lateral movement of the lever 263 decreases. After leaving zone F, the oscillations stop since the roller 268 is then being held in engagement with a straight surface of the cam section 275c. The oscillating movement of the lever 263 is limited by two posts 280 and 281 (FIG. 17) which project upwardly from plate 172 in the path of movement of an abutment member 282 (FIG. 18) that projects downwardly from finder gear mounting member 171.

The finder gear mounting member 171 of each carriage has an integrally formed arm 300 (FIG. 13) that projects upwardly and forwardly and has a pin 301 secured in its outer end. The hub 303a of a bellcrank 303 is pivotally mounted on the pin 301, and an arm 303b of the bellcrank is provided with a split hub 303c that carries a nylon mounting member 304. A magnet 305 is mounted on member 304 in opposed relation to a magnet 306 that is mounted on a base flange 307 of the body member 171 of the carriage. The other arm 303d of the bellcrank 303 has a yoke end portion 308 in which a finder wheel 309 is rotatably mounted on a fixed pin 310 that has end portions 310a and 310b (FIG. 14) projecting on opposite sides of the yoke. During operation of the machine, each finder wheel 309 is rotated and urged upwardly against the undersurface of a peach so that the wheel will rise up into the indent when the indent has been found. This upward urging of the finder wheel is carried out by the interaction of the magnets 305 and 306 which are so mounted that the poles are spaced apart by a narrow air gap, the north and south poles being so located that the adjacent poles attract each other as will be apparent from the north and south pole notations in FIGURE 13. A strong attraction exists between the poles when they are in the relative position shown in FIGURE 13, this being the position which they occupy when the finder wheel 309 is raised into the stem indent of the peach.

When the finder wheel is depressed by an unoriented peach, the magnet 305 is swung a short distance about the axis of the pivot pin 301 and to the right as seen in FIGURE 13. This pivotal movement of one magnet, causing it to move laterally relative to the other magnet, separates the opposite unlike poles of the magnets a short distance and thus reduces the force of attraction between them. However, this same movement brings one pair of like poles of the magnets progressively closer to each other until the finder wheel 309 engages a drive gear 320 (FIG. 14). Throughout the range of movement of the bellcrank 303, therefore, there exists a force which tends to bring the magnets to their centered position with unlike poles opposite each other as shown in FIGURE 13. Thus, this force will constantly tend to raise the finder wheel so that it will rise easily into the stem indent upon registry therewith.

The finder wheel drive gear 320 (FIG. 18) is mounted on oilite bearings on a shaft 322 that is rotatably mounted in a hub 333 of the wall 250 by means of a sleeve bushing 334, that is made of non-conducting material, such as Nylatron. A flange on the end of sleeve 334 insulates the wall 250 from a nut 335 that is disposed on shaft 322. A washer 337 of the same non-conducting material is disposed around shaft 322 between the hub 333 and a metal plate 339 which has an opening receiving the shaft 322 and an inturned upper end portion 339a. With this arrangement, the wall 250 is insulated from shaft 322 which, as will be explained presently, acts as an electrical conductor and completes an electric circuit by the engagement of a nut 322a with a yieldable metal strip 340 that is mounted on the frame of the machine in a manner to be described presently. The gear 320 which is made of steel has a bevel gear 343 of plastic, non-conducting material, such as Nylatron Gs, pressed on one end. Bevel gear 343 meshes with a non-conducting bevel gear 344 that is keyed by inter-engaging flat drive surfaces to a shaft 348 which is journalled for rotation in the tubular shaft 255. A snap ring 350 holds shaft 348 in vertical position, and a sprocket 352 is secured to the lower end of shaft 348 for rotation therewith by a nut 357.

Referring to FIGURE 3 it will be noted that an endless chain 370 (the pitch line of which is indicated by a center line) is mounted in the machine at zone E.

This chain has a straight run 370a that moves from left to right (FIG. 3) i.e., in a direction opposite to the direction of movement of the carriages. The sprocket 352 (FIG. 18) of the carriage is so designed that, when the carriage moves through zone E, the sprocket engages the run 370a of the chain, whereby the chain rotates the sprocket, the shaft 348, the bevel gears 343, 344, and the finder wheel drive gear 320. Therefore, if a peach is resting on the finder wheel 309 and holding it down in meshing engagement with the drive gear 320, the finder wheel will be rotated as the associated carriage moves through zone E. The chain 370 is trained around suitable idler sprockets 371 that are journalled in the frame, a drive sprocket 374 keyed to a shaft 375, and around one sprocket 372 that is mounted on a spring-loaded pivoted chain-tightener lever 373.

A peach support ring 380 (FIGS. 14 and 18) is formed on the upper end of a mounting block 381 so that it is positioned immediately below the centering ring 225. The block 381 carries a rotatable cam follower roller 383 which, when moved vertically by a cam, constructed in accordance with the present invention, is effective to raise or lower the block relative to a bolt 384 that passes through an elongate slot 385 in block 381 and through the hole 184 in post 181 (FIG. 15). As seen in FIGURE 20, a coil spring 390 is disposed around the bolt 384 and engages two spaced washers 392 and 393, washer 392 being in abutment with block 381 and washer 393 being in abutment with a nut 395 threaded on bolt 384. The face of block 381 adjacent the post 181 is provided with two spaced vertically extending flanges 396 and 397 (FIG. 20) that define a guideway in which the tongue 183 of the post 181 is slidably disposed. It will be evident that the spring 390 holds the peach support ring 380 in position on the post 181 with a predetermined force which can be varied by adjusting the nut 395 on the bolt. Also, it will be seen that, while the force is sufficient to hold the support ring at a predetermined elevation while a peach is carried through the machine, it will permit the ring to be moved up or down when the cam follower roller 383 is moved up or down by a camming surface formed on a cam plate 400 (FIG. 4) that is mounted on the inner side of the wall section 216 of the machine.

The cam plate 400 is provided with a flat rear surface 401 (FIG. 7) disposed in a sliding engagement with the flat inner surface of wall section 216, and side surfaces 402 and 403 disposed in sliding engagement with a pair of spaced vertical guide bars 404 that are secured to the wall section. A tapped hole 405 in the cam receives a capscrew 406 that extends through a vertically extending slot 407 in the wall section 216, said capscrew having an enlarged knurled end 406a (FIG. 5) and being effective to draw the cam plate 400 into tight, non-moving contact with the wall. It will be evident that, when the capscrew 406 is loosened to release the gripping contact of the cam plate with the wall, the cam plate which is still threadedly engaged by the capscrew, can be adjusted vertically merely by sliding the capscrew up or down in the slot 407.

The cam plate 400 has a camming groove formed therein which is defined by inclined entrance walls 410a and 410b, parallel spaced walls 410c and 410d, and diverging walls 410e and 410f defining an exit passage. As seen in the schematic showing of FIGURE 4, if a carriage C' is travelling at an elevation at which the cam follower roller 383 of the peach support ring block 381 is moving along a horizontal path indicated by center line 412, and it becomes necessary to lower the support ring 380 for any reason, as for example when larger peaches begin to be fed into the machine, the cam plate can be adjusted downwardly in the manner described above so that the longitudinal centerline of the channel defined by the central walls 410c and 410d is at the new elevation at which the follower rollers 383 of the carriages must travel so that the support rings 380 are at the desired elevation. Then, the follower roller 383 of each carriage will engage the inclined wall 410a of the stationary cam plate 400 and be moved downwardly until it passes through the channel between walls 410c and 410d. Thus every support ring will be automatically adjusted as it passes the cam plate, the spring-loaded mounting of the support ring block 381 being effective to permit the adjusting movement of the block. If it is necessary to have the support rings travel at a higher elevation, the cam plate 400 can be adjusted upwardly.

After the indent of the peach has been found and the finder wheel 309 is disposed in the indent, the finder wheel moves out of engagement with the drive gear 320 by means of a lifting lever 420 (FIG. 17) that has a hook shaped forward end 421 pivotally disposed over the upper ends of the two arms 180a and 180b (FIG. 7) of the bracket 180 which is fixed to the carriage plate 172. A spring 423 that is connected to the lower web of bracket 180 and extends upwardly into an opening 424 in lever 420, is hooked in a hole (not shown) within the opening 424 and is effective to pivot the lever downwardly until a flat wall portion 425 of the hooked end of the lever engages the rear faces of the arms 180a and 180b of the bracket 180. The lifting lever 420 is thus held in the lowered position of FIGURE 17 with an arcuate end portion 427 disposed below a pin 429 (FIG. 18) projecting from one leg of the yoke end 308 formed on the finder wheel bellcrank 303. A cam follower arm 430 is also formed on the lifter lever 420 and, when the lever 420 is held in the above-mentioned lowered position, the arm 430 is at an elevation such that it engages an upwardly slanted end 432a (FIG. 3) of an arcuate cam strip 432 as the associated carriage moves into zone F. As the cam follower arm is raised, the arcuate portion 427 of the lifting lever engages the pin 429 of the finder bellcrank, to pivot the bellcrank and raise the finder wheel 309 and the peach thereon.

As each carriage moves through zones E and F, the centering ring 225 is disposed around the peach in the carriage at an elevation in or slightly below a horizontal plane that passes through the peach half way between the top and bottom surfaces of the peach. According to the teaching of the present invention, the centering ring 225 of each carriage is progressively lowered as the carriage approaches the reject mechanism H so that the peach can be efficiently engaged and pushed out of the carriage. Lowering of the centering ring is accomplished by means of an elongate cam strip 450 (FIG. 2) that has an end portion 450a (FIG. 3) adjacent the end of zone F and a terminal end 450b positioned on the downstream side of the point at which the transfer mechanism J lifts the peaches out of the carriages. As seen in FIGURE 18, the cam strip has a lower vertical plate portion 450c secured to a plurality of brackets 451a–d which are, in turn, secured to the side of the carriage guide bar 161. Cam strip 450 also has an upper inturned flange 450d that overlies the patch of movement of the cam follower roller 245 which, as seen in FIGURE 16, is mounted on the member 229 that slides on the fixed post 173 and carries the centering ring. Referring to FIGURE 2, it will be noted that each roller 245 engages the downwardly inclined undersurface of the inturned flange 450d which is effective to progressively force the roller 245 and the attached centering ring downwardly. Just before the reject mechanism is reached, the centering ring reaches a lowered position wherein the centering ring 225 and the fruit support ring 380 are at substantially the same height.

*Reject mechanism*

The reject mechanism H includes a paddle 470 that is pivotally mounted on a flange 471 projecting upwardly from a bridge 472 which is bolted at its ends to the walls 473 of the pitting machine A. A shoulder cap screw 475, that mounts the paddle on the bridge, also receives a spring anchor 476 which has a portion encircling the capscrew and a portion containing a hole in which one end of a spring 477 is disposed in hooked engagement. The other end of the spring is anchored in a bellcrank 479 which is pivotally secured to a tab (not shown) of the bridge by means of a capscrew 480. An adjustable link 481 is pivotally connected to the paddle 470 and to one leg of bellcrank 479, the other leg of the bellcrank being pivotaly connected by a capscrew 482 to a rigid strap 483 projecting downwardly from the armature of a solenoid 485 that is mounted in fixed position in the pitting machine A. The strap 483 has a flange 483a (FIGURE 24) at its lower end that is apertured to receive a capscrew 487 which is mounted in fixed position on a bracket 488 which is fixed to the bridge 472. A pair of compression springs 490 and 491 are disposed on capscrew 487, the spring 490 being between the flange 483a and an upper arm of the bracket 488 while the spring 491 is disposed between the flange 483a and a lower arm of the bracket 488. When the solenoid 485 is energized, the strap 483 is pulled upwardly, causing the bellcrank 479 to pivot clockwise (FIG. 22) against the resistance of the spring 477. Accordingly, the link 481 swings the paddle 470 clockwise about capscrew 475 to engage and project a peach in the carriage into a chute 493. The chute 493 is a four-sided vertically extending member that is bolted in fixed position on the frame of the machine, and has an open slot 493a along one side and an opening 493b in its hooded upper end that faces the paddle 470. The springs 490 and 491 cushion the movements of the paddle, and the spring 477 is effective to return the mechanism including the paddle to its initial position when the solenoid is deenergized.

*Transfer mechanism*

The transfer mechanism J comprises a shaft 530 (FIG. 25) that is journalled for rotation in spaced side walls 473 (FIG. 26) of the pitter unit A. A mounting member 535 is keyed to shaft 530 and is provided with three equiangularly spaced, radially projecting flanges 535a, 535b, and 535c. As seen in FIGURE 26, each flange is an elongate member which has a U-shaped lever 538 at each end pivotally mounted on a pair of aligned pins 539 that project from opposite sides of the flange. The two levers 538 are identical, each lever including a pair of side plates 538a and 538b (FIG. 28) connected by an integral end wall 538c. A link 542 (FIG. 27) is pivotally connected to the side plate 538a of one lever and the side plate 538b of the other lever so that the levers swing simultaneously. Also, it should be noted that, since the link is connected to one lever on the opposite side of a line passing through the two pivot pins 539 from the side on which it is connected to the other lever, the levers swing alternately toward and away from each other.

A pair of links 546 (FIG. 26) are pivotally mounted on pins 548 projecting from each flange. At its opposite end, each link 546 is pivoted on a pin 550 projecting from a block 551a of a gripper mounting member 551. A second pin 552, projecting from block 551a, pivotally mounts the adjacent U-shaped lever 538. The pins 539, 548, 550 and 552 are so located that each link 546 and its associated lever 538 form a parallelogram linkage which assures straight-line movement of a peach gripper head 554 carried by the mounting member 551 as the two opposed levers 538 are urged toward each other by a spring 553 that is connected between the levers. Each head includes a holder 555 having a cylindrical stub shaft 555a rotatably supported in a hub 551b of the mounting member 551, the axis of shaft 555a being parallel to a line connecting pivot pins 552 and 550. A gripper element 558 has a generally square extension 558a that fits into a deep groove 559 in the holder 555 and is locked therein by a setscrew 560. The gripper element is made of a resilient material such as neoprene and has a plurality of elongate grooves 558b formed therein. The shaft 555a projects through the hub 551b and has one end of a lever 562 clamped thereon. The other end of lever 562 carries a rotatable cam follower roller 563 which is arranged to ride along a cam surface 564, being urged against the surface 564 by a torsion spring 566. As seen in FIGURE 28, each spring 566 has an end portion 566a disposed in a notch 567 in the hub 551b, and an end portion 566b engaged in a hole 568 in the lever 562. At a particular section of the cam, the cam surface 564 is so designed that the follower 563 moves out of engagement with the surface. When this happens, the torsion spring 566 continues the rotation of the lever until an abutment member 562a on the lever engages a stop member 569 on the hub 551.

Referring to FIGURE 30 wherein the mounting member 535 and part of the structure is shown in phantom lines so that the cams and associated followers are emphasized, it will be seen that each torsion spring urges the levers 562 inwardly, clockwise in FIGURE 30, to move the rollers 563 toward contact with the cam surface 564. The cam surface 564 is formed on a flange 575 (FIGURE 29) that projects outwardly from a plate 580. The plate 580 has a cylindrical opening which receives a cylindrical portion 581a of a bearing unit 581, the unit 581 being secured to the plate 580 by capscrews 583. The adjacent side plate 473 of the pitter unit A has an opening 584 which receives an annular flange 580a on the cam plate 580. The area of the side plate 473 that is around the opening 584 is disposed between the cam plate and an enlarged annular flange 581b of the bearing unit 581. Thus, the cam plate 580 is effectively locked on the side plate of the pitter.

Before the cam plate 580 is locked on the side plate of the pitter, an inner cam 585 is bolted to the plate 580 by means of a plurality of capscrews 586. The inner cam has an internal camming surface 587 along which three rollers 588 ride. Each roller 588 (FIG. 28) is rotatably mounted on the end plate 538c of one of the levers 538. Accordingly, as seen in FIGURE 30, when the gripper mounting member 535 is rotated counterclockwise (FIG. 30) the torsion springs 566 associated with levers 562 urge the rollers 563 toward engagement with the exterior cam surface 564, and the follower rollers 588 on levers 538 ride along the inner cam surface 587.

Referring to FIGURE 25 it will be noted that, as the flanges 535a, 353b and 535c of the transfer mechanism J rotates counterclockwise and the carriage C moves toward the right, they pass through a pick-up zone that is in a vertical plane T passing through the axis of shaft 530. It is in this zone that opposed gripping elements move inwardly toward each other to grip a peach being conveyed by the carriage C. As each arm, as for example arm 535b (FIG. 25) approaches the plane T, the roller follower 588 (FIG. 30) associated with the arm is riding along a camming surface 587a that is relatively close to the center of cam 585 and therefore is adapted to hold the levers 538 in the pivoted position shown in FIGURE 27. Accordingly, as the arm 535b approaches plane T, the gripping elements 558 are held in open position. Just before the arm reaches plane T, the follower roller engages an inclined camming surface 587b which allows the spring 553 to swing the levers 538 inwardly, moving the gripper elements into contact with a peach in the carriage C, substantially as shown in FIGURE 26.

Referring to FIGURE 31, it will be noted that when the gripper elements 558 of each arm pass through the radial, vertical plane T, the axis of the peach, which is indicated by phantom line L, is disposed in this plane. Also, it should be noted that the grooves 558b of each gripping element are parallel to plane T, being held in this parallel position due to the fact that the associated lever 562 is held in a particular angular position by the follower roller 563 riding along the cam surface 564. As the gripping elements move away from the pick-up zone, they lift the peach out of the carriage C and swing it upwardly toward the entrance of the pitting mechanism A which is defined by two spaced vertical blades 590 and 591 that have sharpened edges 590a and 591a, respectively, extending along their front edges and along their confronting side edges. Referring to FIGURE 32 it will be noted that when a peach is impaled on the blades 590 and 591, which are in a vertical plane aligned with the suture plane of each peach that has been correctly aligned and oriented, the pit P' must be disposed with its axis 592 oriented generally parallel to the cutting edges 590a and 591a so that the edges will cut close to the side edges of the pit. To attain this re-orientation of the peach, it must be rotated approximately 90° about the axis of the gripper element. This rotation of the peach is carried out by the torsion springs 566 that are connected to the gripper elements and are arranged to urge each roller follower 563 into contact with the cam surface 564. The cam surface 564 is farthest from the shaft 530 at a point P1 on the periphery of the cam just ahead of the plane T. Proceeding counterclockwise around the cam, it will be seen that the cam surface is disposed progressively closer to the shaft 530. Accordingly, the lever 562 and the gripper element mounted thereon are rotated clockwise about their own axis as the associated follower 563 moves along this surface. At point P2 the cam surface 564 moves in toward the shaft 530 at a greater rate so that the lever 562 is quickly pivoted to the position at which the abutment member 562a on the lever engages the stop 569 on the fixed hub 551. Since the lever can pivot no further, it is the engagement of the abutment member 562a with the stop 569 that determines the orientation of the peach and its pit as the peach is moved onto the blades 590 and 591. After the peach is deposited on the blades, the follower roller 563 rides along a portion of the cam surface 564 that progressively moves away from the shaft 530 and, accordingly, the lever 562 is pivoted in an opposite direction as the roller moves toward the point P1.

It will be noted in FIGURE 25 that an inclined diverter plate 595 is mounted on the support frame 212 on the downstream side of the transfer station T. The plate has a leading edge 596 that overlies the path of movement of the carriages, and is effective to remove any peaches that are not picked up by the lifting mechanism J.

*Pitter*

The pitter A includes the pair of side plates 473 each of which is bolted at its lower end portion to an angle bar 600 (FIG. 22) welded to one of two auxiliary support bases 601 or 602. As indicated in dotted lines in FIGURE 1, the base 601 is positioned within the loop defined by the carriage conveyor D, while base 602 is outside of said loop. The bases 601 and 602 may, of course, be secured by braces and the like to the main base 40 to hold the unit A in fixed position relative to the rest of the machine. It will be noted in FIGURE 1 that a longitudinal vertical plane X of the unit A is in alignment with the longitudinal centerline of the carriage C passing therebeneath. The relationship of the members of the transfer mechanism J relative to the plane X is seen in FIGURES 26 and 27.

Mounted between the upper portions of the two plates 473 is a pair of spaced vertical blades 590 and 591. Blade 591 is rigidly secured between the side plates 473 by means of two brackets 607 (one only being shown) each of which is secured at one end to blade 591 and at the other end to one of the plates 473. Blade 590 is bolted to a bracket 608 that is secured to a plate 609 that is secured between the side plates 473. Blades 590 and 591 are also in plane X so that, as the peach is raised by the transfer mechanism J, it is impaled on the blades, the tapered sharpened edges 590e and 591a cut through the peach along its suture plane on opposite sides of the pit which is moved into the space between the blades.

A fruit transfer and positioning mechanism 612 is mounted between the side plates 473 and includes a pair of aligned tubular drive members 613 (one only being shown) which are keyed to a shaft 615. Six equi-angularly spaced cups 614 are operatively connected to each drive member 613 so that six pairs of opposed cups are mounted for movement in a circular path around the axis of shaft 615. The cups of each pair are also movable toward the blades 590 and 591 to engage a peach that has been impaled thereon, and move it upwardly along an arcuate path.

As the peach is moved upwardly, it is carried across a rotating circular saw 620 which is disposed in the plane of the blades 590 and 591 and is arranged to cut the peach in half. Immediately following the severing of the flesh and the pit into halves, the two halves of the peach, still under the control of the cups 614, pass onto the outer surface of two guide plates 622 and 623 (FIG. 1) which have lower portions that lie closely adjacent the sides of the saw blade 620 and diverge away from the blade to separate the peach halves as the halves are moved upwardly along the guide plates. Each peach half is thus supported between a cup 614 and the surface of one of the guide plates 622 or 623, and is moved over this surface to a pitting head 630. The head 630 has two pitting units 630a and 630b (FIG. 1) which are identical but have their elements facing in opposite directions so that a pit ejector 631 (FIG. 25) of each unit is arranged to operate on each peach half to remove the pit half. Most of the mechanisms of the peach pitter A are identical to mechanisms disclosed in detail in the U.S. patent to Reimers et al. No. 3,132,675 and accordingly, the disclosure of these mechanisms in the Reimers et al. patent are incorporated by reference herein. These mechanisms include the pitting head 630 and all of its operating mechanisms, the two side plates 473 that support the head 630, the fruit positioning and transfer mechanism 612, its mounting and its actuating mechanism, and the circular saw 620 and its drive mechanism. It will, of course, be recognized that the saw 620 is slightly smaller in diameter than the saw disclosed in the Reimers et al. patent and that the lower portions of the guide plates 622 and 623 have been slightly modified to accommodate the new circular cutter.

In general, the fruit positioning mechanism 612 includes two sets of six pair of pivotal arms 632, one set being pivotally mounted on each of the above mentioned tubular drive members 613 to which it is secured for joint rotation. Each arm 632 of one set of arms is disposed directly opposite an arm of the other set of arms and, accordingly, the fruit engaging cup 614 on the outer end of each arm is disposed directly opposite a cup on an opposed arm. A cam mechanism (not shown) is arranged to actuate a lever system connected to each of the arms so that, when a pair of opposed cups 614 are disposed directly opposite a peach impaled on the blades 604 and 605, they will be moved inwardly toward the blades to grip the peach and move it upwardly over the saw blade 620 and along the diverging guide plates 622 and 623 to the pitting head 630.

As previously mentioned, the pitting head 630 (FIG. 34) comprises two units 630a and 630b which are substantially identical but have their elements facing in opposite directions. Each unit includes a frame 635 having a side opening that is partially closed by two vertically movable plates 636 and 637, which have arcuate cutting members 636a and 637a respectively formed thereon. As will be explained presently these arcuate members act as pit finders when the plates are moved toward each other to closed position. The plate 636 is raised to open position when a lever 640 engages and depresses a capscrew 641 that is connected to plate 636 through a rocker arm 643. Similarly, the lower plate 637 is moved downwardly by the engagement of the lever 640 with a capscrew 644 that is secured to plate 637. When the capscrews 641 and 644 move out of engagement with the lever 640, springs connected to the plates move them to closed position. The lever 640 is welded to a sleeve 650 (FIG. 35) that is rotatably mounted on a stud 651 that is secured to and projects outwardly from a side plate 473 of the pitter. An actuating arm 653 is welded to and projects radially outwardly from the sleeve 650, and a roller 654 that is rotatably mounted on the end of the actuating arm 653 rides on a camming surface 656a of a cam 656 keyed to a power driven shaft 657. A counter-balance arm 658, which is also welded to sleeve 650, carries a weight 659 near its outer end. A spring 660, connected between the arm 658 and a fixed structural member of the machine, biases the sleeve 650 in a clockwise direction (FIG. 35). The camming surface 656a is so designed that the lever 640 is pivoted in a counterclockwise direction to engage the capscrews 641 and 644 and hold the pit finders 636a and 637a in open position when the pitting head is in position to receive a pair of peach halves that are being advanced along the diverging guide plates by the cups 614.

As previously mentioned, each of the units 630a and 630b has a pit striker or ejector 631 in the form of a hook which is mounted in each unit midway between the cutting edges of the pit finders. The ejector 631 is integrally formed on a gear segment that is arranged to be rotated through a gear train mounted interiorly of the unit, a shaft 670 keyed to one of the gears, intermeshing gears 671 and 672, and a gear segment 673 that is secured for rotation with a lever 674. When the lever 674 is pivoted counterclockwise (FIG. 34), the pit ejector is swung through the opening between the pit finders 636a and 636b to engage a pit half to tear it loose from the peach half.

When a peach half is initially moved into position on the pitting unit by a cup 614 of the positioning mechanism 612, the peach is supported jointly by a guide plate 680 that is secured on the upper end of each of the two diverging guide plates 622 and 623 and by two identical, spaced pit stops 682. Each pit stop is a relatively flat member that is mounted for sliding movement into and away from the opening between the pit finders 636a and 637a. This reciprocating movement of the pit stops is carried out by a lever associated with the pit stops and with a push rod 684 which is slidable in the frame of the unit. The arrangement is such, that when the pitting head is in the rearward position of FIGURE 25, the push rod 684 is in engagement with a fixed cam that is supported from a bracket 685 (FIG. 25) secured in fixed position on a transverse brace 686 rigidly secured between the side plates 473 of the pitter. Engagement of push rod 684 with the cam causes both pit stops 682 to be moved outwardly to a projected position so that, when a peach half is moved into position opposite the pit opening defined by the pit finders, it will move into supported position on the pit stops. When the pitting operation begins, the head moves forwardly in the direction of arrow W (FIG. 34), causing the push rod 684 to move out of engagement with the cam and permitting a spring to actuate the lever to which the pit stops are connected to move the pit stops inwardly of the head.

The pitting head 630 is mounted on a cradle 700 (FIGS. 25 and 34) that has a hub 701 mounted for free rotation by means of a bushing that is positioned on shaft 615 between the two tubular drive members 613 of the fruit positioning mechanism 612. A mounting plate 703, that is secured to the forward end of both units of the pitting head, has a stud that fits into a recess in an arm 700a of the cradle, and a second stud, which projects rearwardly from the two units 630a and 630b of the pitting head extends into a recess in an arm 700b of the cradle. The head is locked on the cradle by means of a bolt 717 that projects through apertures in interfitting flanges of the head and of the arm 700b of the cradle. Accordingly, when the cradle 700 is pivoted on the shaft 615, the head 630 is moved in an arcuate path at the outer end of the cradle arms 700a and 700b.

The cradle 700 is pivoted relative to the shaft 615 by means of a cam 725 (FIG. 25) that is keyed to the shaft 657 extending transversely between the side walls 473 of the machine. The shaft 657 is driven from a motor 727 through a clutch 728 (FIG. 1) and a sprocket and chain drive 729. The cam 725 has a cam track 730 (FIG. 25) adapted to guide a roller follower 731 which is mounted on the cradle arm 700b by a bolt 733. The cam track 730 has a portion 730a that progressively recedes from the shaft 726. Accordingly, when the cam is rotated clockwise (FIG. 25) the roller 731 and the head 630 will be moved toward the front of the machine. It will be understood that the rotation of the cam 725 is coordinated with the movement of the cups of the transfer mechanism 612 so that, when a peach half in a transfer cup is positioned on the pit stops of the pitter head, the head will be moved forwardly with the cup and at substantially the speed of the cup. The cam track 730 has a portion 730b adapted to hold the head for a short period at its outermost position, and a portion 730c adapted to return the head to its initial, peach receiving position.

During the forward movement of the unit toward the front of the machine, the mounting plate 703 of the head 630 is confined between two rollers 740 (one only being shown) which are rotatably mounted in a boss 744 formed on the lower surface of the generally U-shaped brace 686 that is secured between the side walls 473 near their uppermost edges.

As the pitting head 630 moves forwardly, the lever 674 (FIG. 25), which actuates the gear mechanism in the head, comes into contact with a cam 750 (FIGS. 25 and 36) which is bolted to the upper surface of the brace 686. The lever 674 and the cam 750 are so arranged that the rounded outer edge of the lever first engages a camming surface 750*a*, as seen in FIGURE 26, causing the lever 674 to be pivoted counter-clockwise. Pivotal movement of the lever 674 actuates the gear mechanism in the head and results in the pitting hook being swung into engagement with the pit to tear it loose from the peach flesh. Just after the pit is freed from the peach, an edge portion 760 on the lever 674 engages a surface 750*b* on the cam 750 causing the pivoting of the lever to be accelerated whereby a flipping motion is imparted to the pit. It is to be noted that maximum torque is obtained during the actual pitting by the engagement of the outermost end of the lever 674 with the cam, while increased speed is obtained after the pit is loosened by the use of a short length of the lever.

Thus, during the operation of the pitter, a peach is carried upwardly by a pair of the opposed cups 614 of the second transfer mechanism, and is moved past the circular saw 620 which bisects the peach. The two peach halves are then moved upwardly over the diverging guide plates 622 and 623 until each peach half is positioned opposite the pitting opening defined by the pit finders 636*a* and 637*a* which are held in the spaced, open position, shown in FIGURE 25, by the levers 640. Also, at this time the two pit stops 682 are in their projected, peach-supporting position. As soon as the peach half arrives opposite the pitting opening, the cam 725 accelerates the head forwardly so that it operates in conjunction with the feed cup 614. As the head moves forwardly, the cams 656 release the levers 640 which are then quickly moved upwardly by the springs 660 (FIG. 35) permitting the pit finders 636*a* and 637*a* to close. Also, the push rod 684 controlling the pit stops 682 drops off its associated cam surface permitting the pit stops to be retracted, and the lever 674 on top of the unit engages the cam 750 to actuate the gear mechanism and the pit ejector hook 631.

The peach halves are discharged onto an inclined plate 770 which directs them to a collecting chute 771 which may be formed on the lower end of the plate 770. A saw guard 772 and refuse collecting chute 773 is mounted on the pitter adjacent the saw 620.

Other details of the construction and operation of the pitter are described in detail in the above mentioned Reimers et al. Patent No. 3,132,675 and reference may be had to said patent for data not completely described herein.

*Drive mechanism*

The motor 727 (FIG. 25), that is mounted on a bracket 790 secured to the pitter A, drives all of the powered mechanisms of the machine. As previously mentioned, the motor 727 drives the shaft 657 by means of the chain and sprocket drive 729 (FIG. 37). A small gear 791 that is keyed to shaft 657 is in mesh with a large gear 792 that is keyed to the shaft 615 which is the main drive shaft of the fruit positioning mechanism 612. Thus, this mechanism 612 is driven by the motor 727 in timed relation with the cam 725 that controls the forward and rearward movement of the pitting head.

The transfer mechanism J, which removes fruit from the carriage conveyor and delivers it to the blades at the entrance of the pitter, is driven from the motor 727 due to the fact that the large gear 792 meshes with a gear 794 that is keyed to the main shaft 530 of the transfer mechanism.

As seen in FIGURE 29, shaft 530 extends through the bearing 581 and has an end portion on which a collar 800 is keyed. A pin 801 is slidably disposed in a hole 802 in collar 800 and in a hole 803 in a double sprocket 804 that is journalled for free rotation on the end portion of the shaft 530. One wheel 804*a* (FIG. 37) of sprocket 804 is connected through a chain 806 to the shaft 114 which drives the cam 129 (FIG. 8) that controls the opening and closing of the upper and lower gates of the feed mechanism B. The other wheel 804*b* (FIG. 37) of the sprocket 804 receives a chain 808 that is trained around a sprocket 810 which is keyed to a shaft 811. Two bevel gears 812 and 813 are also keyed to shaft 811, bevel gear 812 being in mesh with a bevel gear 815 that is keyed to the drive shaft 151 of the carriage conveyor D. Bevel gear 813 is in mesh with a bevel gear 817 that is keyed to a vertical shaft 818 on which a gear 819 is keyed. Gear 819 meshes with a gear 820 that is keyed to the shaft 374 (FIG. 3) that carries the drive sprocket 375 of the finder wheel-rotating chain 370. Accordingly, the carriages on conveyor D are advanced in timed relation with the actuation of the gates of the feeder B and in timed relation with the movement of the gripper members on the transfer mechanism J.

Referring to FIGURE 8 it will be seen that the bevel gear 815 that drives the conveyor drive shaft 151 also drives the shaft 110 which rotates the tumbling and aligning tube 96 of the feed mechanism through bevel gear 821.

A particular feature of the invention is the use of the removable pin 801 which establishes a drive connection between the drive shaft 530 and the double sprocket 804. The particular advantage of this arrangement resides in the fact that when the pin is removed from engagement with the sprocket 804, the carriage conveyor D and all of the associated mechanism is completely disconnected from the transfer mechanism J and the pitter A. Thus, a person can turn over the pitter and the transfer mechanism, as when adjustments are being made, without being required to actuate the conveyor and feed mechanism. Similarly, the conveyor and feed mechanism can be manipulated independently of the pitter and transfer mechanism.

The circular saw 620 is keyed to a shaft 830 that is driven through a belt and pulley mechanism 832 by a shaft 833 that forms an extension of the shaft of motor 727. It is evident, therefore, that the several power-driven mechanisms of the machine are driven by the same motor and that their timing can be accurately controlled.

*Control circuit for reject mechanism*

As previously mentioned, if a peach is not properly oriented by the time it reaches the reject mechanism H (FIG. 5) the solenoid 485 is energized causing the paddle 470 to sweep across the top of the carriage C and eject the peach. The control circuit for energizing solenoid 485 is shown in FIGURE 39 in which T1 is a transformer connected to a source of A.C. current. The solenoid 485 is connected in a circuit that includes conductors 850 and 851, which are connected between 110 volt connections of the transformer, and relay contacts CR1 and CR2. A second circuit includes a conductor 855 that is connected through full wave rectifier silicon diodes D1 and D2 to end taps of the secondary winding of the transformer T1. This circuit also includes a relay CR, a smoothing capacitor C1, a silicon controlled rectifier SCR, a conductor 856, a fuse F1, a manually operated switch S1, and a conductor 857 connected to a center tap of the secondary winding of the transformer.

A circuit that controls the operation of the main circuit includes a conductor 859, a resistor R2, a potentiometer P1, a switch SW–1 formed by the finder wheel 309 and the drive gear 320 and a second switch SW–2 provided by the nut 322*a* on the shaft of the drive gear and the flexible metal strap 340 which, as seen in FIGURE 38, is secured by bolts 862*a* and 862*b* to an insulated block 863 mounted on the frame bracket 451*b*. The strap 340 is connected by the bolt 862*a* to a conductor 864 (FIG. 39) that leads to the potentiometer P1.

A resistor R1 is connected between conductors 859 and 856, as is a silicon diode D3, which insures that the silicon controlled rectifier SCR will stop conducting when the signal pulse is removed. The control circuits of FIGURE 39 are so arranged that when switch S1 is closed and both switches SW–1 and SW–2 are closed, indicating the arrival of an unoriented peach at the reject station, the circuit containing these switches is completed causing a current of very small value to flow which applies a pulse to SCR. When this occurs, the balanced condition of the circuits is destroyed and pulsating D.C. line current flows through the silicon controlled rectifier SCR and the relay CR. Relay contacts CR–1 and CR–2 in the solenoid circuit are closed, causing the solenoid 485 to be energized to actuate the paddle 470 for ejecting the unoriented fruit from the carriage.

In one successful arrangement the members of the circuit had the following characteristics.

| Member: | Description |
| --- | --- |
| T1 | Transformer Sec. 18–0–18, v. at 0.5 amp. P.R.: 240/440 v., 50/60 c.p.s. |
| D1, D2, D3 | Silicon diodes, General Instrument Company Cat. No. G100G. |
| SCR | Silicon controlled rectifier 1.6 a. at 50 PLV, General Electric Cat. No. C511F. |
| R1 | 1K ½ w. 10% resistor. |
| R2 | 4.7K ½ w. 10% resistor. |
| P1 | 50 K 1 w. potentiometer. |
| C1 | 50 µfd./50 v. capacitor. |
| CR | Relay 12 v. D.C. coil, 2 N.O. contacts. |

*Operation*

While a description of the operation of the mechanism has been incorporated in the description of the apparatus, a brief summary of the operation will be given at this point with particular reference to FIGURES 1 and 5. Peaches are delivered to the feeder B from the hopper 77 and are put into single file by the rotating element of the feeder. Since the gates of the feeder are operated in timed relation with the carriage conveyor D, one peach is deposited into each carriage C on the conveyor. When a peach is deposited in a particular carriage, the peach depresses the finder wheel 309 (FIG. 14) and moves it into contact with the drive gear 320 which is being rotated due to the engagement of the sprocket 352 with the moving chain 370. Rotation of the finder wheel causes rotation of the peach. Also, while in zone E, the finder wheel is being oscillated due to the engagement of the roller 268 with the undulating cam surface provided by the cam strip 275. The rotation and oscillation of the peach is effective to cause the stem indent to face downwardly whereupon the magnetically-urged finder wheel will move upwardly out of engagement with its drive gear 320 and will move part way into the indent of the peach. When this is accomplished, the peach is no longer rotated and is then oriented with its stem-blossom axis vertical.

As the carriage leaves zone E, the cam follower arm 430 (FIG. 14) on the lifting lever engages the cam strip 432 (FIG. 1) and causes the finder wheel and the peach supported thereon to be elevated. Thus, while the carriage moves through zone F, practically the entire weight of the peach rests on the oscillating finder wheel 309. Before the peach has left zone F, the oscillations of the finder wheel has caused the finder wheel to become aligned with the suture plane of the peach and has caused the finder wheel to penetrate more deeply into the stem indent of the peach to lock the peach against rotation relative to the finder wheel. As the carriage leaves zone F, the roller 268 engages the straight surface 275*c* of the cam strip 275 whereby the finder wheel 309 and the suture plane of the peach are positioned and held in the vertical plane X which, as previously mentioned, passes centrally between the gripper elements of the transfer mechanism J, and is the plane of of the circular saw 620 and of the blades 590 and 591 at the entrance to the pitter.

If for some reason the peach has not been oriented by the time it reaches the reject mechanism H, the paddle of the reject mechanism will be actuated to reject the peach.

In this connection it should be noted in FIGURE 2 that the centering ring 225 is lowered as the carriage approaches the reject station which is adjacent bracket 451*b*. Accordingly, the paddle of the reject mechanism is able to cleanly engage and eject the peach.

If the peach is properly oriented, the centering ring is also lowered so that when the transfer station T (FIG. 25) is reached, the opposed grippers of the transfer mechanism J are able to engage and remove the peach from the carriage and deliver it to the blades 590 and 591 at the entrance to the pitter. As the peach travels from the pick-up or transfer station T to the blades, it is rotated about a horizontal axis under control of the cam surface 564 so that its pit is properly oriented for passage between blades 590 and 591.

An opposed pair of cups 614 of the fruit transfer and position apparatus 612 engages the peach impaled on blades 590 and 591 and carries it over the circular saw 620, along the diverging guide plates 622 and 623 to opposite sides of the pitter head 630. When the peach halves are positioned opposite the pitting openings in the pitting head, the head is moved forwardly, to the right in FIGURE 25, causing the lever 674 to be rotated and other mechanisms to be actuated whereby the two pit halves are ejected from the cavities in the peach halves. The peach halves are discharged onto ramp 707 which directs them to chute 771.

Referring again to FIGURE 1, it will be noted that the oval arrangement of the carriage conveyor D makes it possible to obtain the necessary travel of the peach for orienting purposes while requiring a minimum of floor space. Similarly, the oval arrangement provides ease of access to the carriages of the conveyor and to the associated mechanisms. The use of the adjustable cam 400 (FIG. 4) which can be adjusted vertically to cause the entrance walls 410*a* and 410*b* to engage the follower roller 383 and shift the spring-loaded support ring 380 upwardly or downwardly makes it possible to quickly and efficiently adapt the machine for peaches of different sizes.

The feed mechanism B is particularly effective for orienting the peaches in single file and feeding them one by one to the carriages C, and it is to be noted that the spring-loaded rod 238 (FIG. 13) provides means for quickly and effectively installing or removing a centering ring 225 to accommodate peaches of different sizes.

The lowering of the centering ring as it approaches the reject mechanism H facilitates the effective engagement of an unoriented peach and its ejection from the carriage, and the lowering of the centering rings also allows the transfer mechanism J to engage oriented peaches and lift them from the carriages.

An important feature of the present invention resides in the use of the removable pin 801 (FIG. 29) which, upon removal from the double sprocket 804, breaks the driving connection of the carriage conveyor D and its associated mechanisms with the pitter A and the transfer mechanism J and permits independent manipulation of the units for servicing or adjusting.

While I have described one embodiment of my invention, it will be understood the machine is capable of variation without departing from the principles of the invention, and that the scope of the invention should be limited only by the scope and proper interpretation of the claims appended hereto.

I claim:

1. In a fruit processing machine, a support structure, an endless chain mounted in said structure for movement in a circuitous path in a horizontal plane, a plurality of fruit carriages mounted on said chain for movement along said circuitous path, means defining spaced fruit-receiving and fruit-discharge stations along said path, and means on each carriage for orienting and aligning fruit as it is carried from said receiving station to said discharge station, the circuitous arrangement of said endless chain defining oppositely directed runs and a curved end portion along which the fruit can be manipulated to orient and align it and providing an adequate distance of travel of the fruit while requiring a minimum of floor space.

2. In a fruit processing machine, an endless conveyor arranged in an oval pattern in a horizontal plane and having two spaced elongate runs and including a plurality of fruit carriages, means for moving said conveyor, a fruit feeding mechanism disposed above one run of said conveyor at the upstream end thereof, and a transfer mechanism disposed above the other run of said conveyor adjacent the downstream end thereof, said carriage including means for orienting fruit to position the stem axis in vertical position as the carriage traverses said one run of the conveyor and having means for aligning the suture plane of the fruit in a predetermined position during travel along said other run, said transfer mechanism having means for gripping a fruit moving along said other run and lifting it from the carriage.

3. In a fruit processing machine, a support frame; a conveying member mounted in a horizontal plane and movable along said frame; a plurality of fruit carriers mounted on said conveying member; each carrier comprising a support structure and a fruit support member mounted on said structure for yielding vertical adjusting movement relative to said support structure; a cam mounted on said support frame for vertical adjusting movement relative to said frame; and a cam follower mounted on said fruit support member; said cam being disposed in the path of movement of the cam followers of said carriers and being effective as said followers move therepast to engage all followers not positioned at a predetermined desired level and move said followers to said desired level, thereby automatically adjusting the position of the associated fruit support members.

4. In a fruit processing machine, a support frame; an endless conveyor member movable along said frame; a plurality of carriages mounted on said conveyor member; each carriage including a base plate, a fruit support ring slidably mounted for vertical adjusting movement on said base plate, spring means resisting said adjusting movement, and a cam follower connected to said support ring; a cam adjustably mounted on said support frame in the path of movement of the cam followers on said carriages, said cam being effective during movement of said carriages to move each fruit support ring to a particular height corresponding to the adjusted position of said cam in said frame.

5. In a fruit processing machine, a support frame; a conveying member movable along a fixed path in said frame; a plurality of fruit carriers secured to said conveying member for movement therewith; each carrier having a support structure, a fruit support member having a portion mounted in sliding engagement with said structure, spring means urging said portion into frictionally locked engagement with said structure, and a cam follower on each fruit support member; a side plate mounted on said support frame and having a vertical slot therethrough; a cam adjacent the inner face of said side plate; an adjusting member connected to said cam and extending through said slot to the exterior of said side plate; said cam having a camming surface disposed in the path of any cam follower not at a predetermined level and effective to shift such follower to said level thereby automatically adjusting the vertical position of the associated fruit support member; and means for locking said adjusting member in fixed position relative to said side plate.

6. In a fruit processing machine, an endless chain conveyor having a plurality of pairs of upstanding cylindrical drive pins; a guide track adjacent said conveyor; a plurality of carriages mounted on said chain, each carriage including a base plate having a member adjacent one side portion in guided engagement in said guide track and a pair of cylindrical apertures adjacent the opposite side portion adapted to receive a pair of the cylindrical drive pins of said chain, the diameter of each of said apertures being larger than the diameter of the drive pin received therein; a tubular spacer member having an internal bore adapted to receive one of said pins and an external diameter of a size to fit snugly into the associated cylindrical aperture of said plate; and means for locking said spacer member in position between said pin and said plate, removal of said spacer member being effective to permit lateral movement of said plate relative to said pin to disengage said base plate from said guide track and permit movement of said carriage away from said chain.

7. In a fruit processing machine, a conveyor, a plurality of carriages secured to said conveyor, each carriage having a base plate, a post rigidly mounted on said plate and projecting upwardly therefrom, a centering ring having an apertured horizontal portion overlying said plate and a vertical portion in hooked pivoted engagement with said post, a rod slidably journalled in said plate, and spring means operativey connected betweeen said plate and said rod for holding said rod in an elevated position with the upper end of said rod disposed in the aperture in the horizontal portion of said centering ring, movement of said rod downwardly against the resistance of said spring means being effective to move said upper end out of said aperture to permit said centering ring to be moved out of hooked engagement with said post.

8. In a fruit processing machine, a support frame; a conveying member movable along said frame; a plurality of carriages secured to said member for movement therewith; means for driving said conveying member; each of said carriages having a support structure, a fruit support member mounted in said structure and having an upper surface for supporting a fruit thereon, a centering ring adjustably mounted on said structure, a cam follower operatively connected to said ring, and spring means holding said ring at a desired height wherein said ring is spaced above the upper surface of said fruit support member and a fruit on said support member is disposed in the central aperture of said ring; a cam mounted on said frame adjacent the path of movement of said carriages and arranged to engage the cam followers of said centering rings to move said rings downwardly for a predetermined interval during the movement of said carriages with said conveying member to a lowered position wherein the associated fruit support members are substantially at the same elevation as the centering ring.

9. In a fruit processing machine, an endless chain mounted in a horizontal plane; a plurality of carriages secured to said chain for movement along a circuitous path; means for driving said chain; each of said carriages having a support frame, a fruit centering member mounted in said frame and having an opening therein for receiving a fruit, a fruit support member below said centering member for supporting a fruit in said centering member, said centering member being movable between an upper position in which the support member is spaced below the centering member and the fruit is disposed a substantial distance down in the centering opening and a lower position in which said support member is substantially at the level of said centering member and substantially all of the fruit is above the elevation of said centering member; a reject mechanism mounted alongside the path of movement of said carriages at a reject station and having a paddle movable across the carriages at an elevation slightly above the elevation of the fruit support members of said carriages; and means for moving the centering member of each carriage to said lower position prior to the arrival of the carriage at said station and holding said carriage in lowered position until after the carriage passes said station.

10. In a fruit processing machine, a conveyor; a plurality of fruit carriages on said conveyor; a fruit transfer mechanism mounted above said conveyor and having a drive shaft and cooperating fruit grippers movable along a path closely adjacent the upper surface of said carriages to engage and remove fruit from said carriages; means for driving said shaft; an apertured collar keyed to said shaft; a sprocket rotatably journalled on said shaft adjacent said collar, said sprocket having an aperture adapted to be aligned with the aperture in said collar; a pin removably positioned in said aligned apertures; and means for driving said conveyor from said sprocket; the removal of said pin from one of said apertures being effective to break the drive connection between said shaft and said conveyor.

11. In a fruit processing machine, a support structure, an endless chain mounted on said structure for movement along a circuitous path in a generally horizontal plane and defining an inner loop, a generally vertical support member extending around said structure outside of said endless chain and defining an outer loop, a plurality of fruit carriers having inner edge portions secured to said chain for movement therewith and members adjacent the outer edges of said carriers disposed in supported relation on the inner side of said support member, and means for driving said chain to move said carriers along said circuitous path.

12. In a fruit processing machine, a support structure, an endless chain mounted on said structure for movement along a circuitous path in a generally horizontal plane and defining an inner loop, a plurality of side plates removably secured to said support structure outside of said endless chain and coacting to enclose said inner loop, a carriage support member mounted in fixed position adjacent the inner surface of said side plates and defining a substantially continuous outer loop, a plurality of fruit carriages, each carriage having an inner edge portion secured to said chain for movement therewith and a member secured to its outer edge portion and disposed in supported engagement with said carriage support member, and means for driving said chain to move said carriages along said circuitous path, the removal of each of said side plates being effective to expose said carriages and said chain for servicing and inspection.

13. In a fruit processing machine, an endless conveyor mounted in a horizontal plane, a plurality of fruit support carriages mounted on said conveyor, each carriage having a finder wheel mounted for rotation and a sprocket connected to said wheel whereby rotation on a vertical axis of said sprocket effects rotation of said wheel; an endless drive chain mounted in a horizontal plane and disposed alongside a sector of said conveyor in driving engagement with the sprockets on carriages passing along said conveyor sector; and means for driving said drive chain.

14. In a fruit processing machine; an endless chain conveyor mounted in a horizontal plane; a plurality of fruit carriers on said conveyor; means for driving said conveyor to advance said carriers along a predetermined path; a fruit transfer mechanism mounted above a downstream portion of said conveyor and comprising a turret mounted for rotation about a horizontal axis, a pair of fruit grippers on said turret movable horizontally from a spaced-apart position to an adjacent fruit gripping position; means for rotating said turret in timed relation with said conveyor drive; a pitting head disposed above said transfer mechanism; a fruit positioning means between said head and said transfer mechanism; means for actuating said fruit grippers as said turret rotates to grip a fruit advanced on said conveyor and lift it from said conveyor and raise it to an elevated position; a pair of coplanar vertically spaced blades adapted to receive the fruit from said turret; and gripper cups on said fruit positioning means for grasping a fruit on said blades and carrying it toward said pitting head.

References Cited by the Examiner
UNITED STATES PATENTS

| | | | |
|---|---|---|---|
| 2,568,947 | 9/1951 | Carroll | 198—33 |
| 2,682,253 | 6/1954 | Scherer et al. | |
| 2,786,566 | 3/1957 | Taggart et al. | |
| 2,788,818 | 4/1957 | Skog | 198—33 X |
| 2,918,098 | 12/1959 | Keesling | 198—33 X |
| 2,979,093 | 4/1961 | Creed et al. | 198—33 X |

EVON C. BLUNK, *Primary Examiner.*

R. E. KRISHER, A. C. HODGSON, *Assistant Examiners.*